(12) United States Patent
Guo et al.

(10) Patent No.: US 11,284,221 B2
(45) Date of Patent: Mar. 22, 2022

(54) METHOD AND APPARATUS FOR DECIDING NUMEROLOGY IN A WIRELESS COMMUNICATION SYSTEM

(71) Applicant: ASUSTek Computer Inc., Taipei (TW)

(72) Inventors: Yu-Hsuan Guo, Taipei (TW); Richard Lee-Chee Kuo, Taipei (TW); Wei-Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/855,196

(22) Filed: Dec. 27, 2017

(65) Prior Publication Data

US 2018/0192255 A1 Jul. 5, 2018

Related U.S. Application Data

(60) Provisional application No. 62/442,625, filed on Jan. 5, 2017.

(51) Int. Cl.
*H04W 4/06* (2009.01)
*H04W 72/00* (2009.01)
*H04L 12/18* (2006.01)

(52) U.S. Cl.
CPC ............ *H04W 4/06* (2013.01); *H04L 12/189* (2013.01); *H04W 72/005* (2013.01)

(58) Field of Classification Search
CPC ...... H04W 4/06; H04W 72/005; H04L 12/189
See application file for complete search history.

(56) References Cited

U.S. PATENT DOCUMENTS

| 7,436,811 | B2 | 10/2008 | Putcha |
| 9,526,091 | B2 | 12/2016 | Chou |
| 2005/0282571 | A1* | 12/2005 | Oprescu-Surcobe ........ H04W 28/10 455/503 |
| 2012/0269110 | A1 | 10/2012 | Walker et al. |
| 2013/0242738 | A1 | 9/2013 | Chang |

(Continued)

FOREIGN PATENT DOCUMENTS

| EP | 1392074 | 2/2004 |
| JP | 2016528849 | 9/2016 |

(Continued)

OTHER PUBLICATIONS

Office Action from Taiwan Intellectual Patent Office in corresponding TW Application No. 106146104, dated Sep. 18, 2018.
(Continued)

*Primary Examiner* — Jeffrey M Rutkowski
*Assistant Examiner* — Jasper Kwoh
(74) *Attorney, Agent, or Firm* — Skaar Ulbrich Macari, P.A.

(57) ABSTRACT

A method and apparatus are disclosed from the perspective of a UE. In one embodiment, the method includes receiving a first signaling, wherein the first signaling includes an identity of a broadcast or multicast service. The method further includes receiving a second signaling, wherein the second signaling indicates an association between a numerology and an information of the broadcast or multicast service. The method also includes using the numerology to receive the broadcast or multicast service.

20 Claims, 26 Drawing Sheets

(56) References Cited

U.S. PATENT DOCUMENTS

| | | | |
|---|---|---|---|
| 2013/0247118 A1* | 9/2013 | Oyman | H04W 72/0413 |
| | | | 725/109 |
| 2015/0055541 A1 | 2/2015 | Zhang | |
| 2016/0198236 A1* | 7/2016 | Li | H04W 4/06 |
| | | | 709/219 |
| 2016/0352551 A1 | 12/2016 | Zhang et al. | |
| 2017/0013423 A1* | 1/2017 | Zisimopoulos | H04L 12/189 |
| 2017/0111930 A1* | 4/2017 | Rajagopal | H04B 7/0626 |
| 2017/0156140 A1* | 6/2017 | Islam | H04L 5/0064 |
| 2017/0251500 A1 | 8/2017 | Agiwal | |
| 2017/0331577 A1* | 11/2017 | Parkvall | H04L 5/1469 |
| 2017/0366311 A1* | 12/2017 | Iyer | H04B 7/0482 |
| 2018/0048994 A1* | 2/2018 | Kwon | H04W 72/04 |
| 2018/0063595 A1* | 3/2018 | Lo | H04N 21/4756 |
| 2018/0092106 A1* | 3/2018 | Rico Alvarino | H04W 72/005 |
| 2018/0097678 A1* | 4/2018 | Zhou | H04L 1/0013 |
| 2018/0110019 A1* | 4/2018 | Ly | H04W 56/001 |
| 2018/0227718 A1* | 8/2018 | Lu | H04W 4/06 |
| 2018/0234896 A1* | 8/2018 | Liu | H04W 36/00 |
| 2018/0241508 A1* | 8/2018 | Chervyakov | H04L 27/2675 |
| 2018/0295009 A1* | 10/2018 | Lindoff | H04L 27/2663 |
| 2019/0103931 A1* | 4/2019 | Yi | H04B 7/0639 |
| 2019/0165894 A1* | 5/2019 | Choi | H04B 17/24 |
| 2019/0174406 A1* | 6/2019 | Hwang | H04W 36/0066 |
| 2019/0223157 A1* | 7/2019 | Hwang | H04L 27/2602 |

FOREIGN PATENT DOCUMENTS

| | | |
|---|---|---|
| WO | 2006083140 | 8/2006 |
| WO | 2016082706 | 2/2016 |
| WO | 2016060814 | 4/2016 |
| WO | 2016186827 A1 | 11/2016 |
| WO | 2017028504 | 2/2017 |

OTHER PUBLICATIONS

European Search Report from corresponding EP Application No. 17210607.2, dated May 7, 2018.

Office Action from Japan Patent Office in corresponding JP Application No. 2017-250292, dated Jan. 8, 2019.

Office Action from Taiwan Patent Office in corresponding TW Application No. 106146104, dated Apr. 15, 2019.

Notice of Submission of Opinion from Korean Intellectual Property Office in corresponding KR Application No. 10-2017-0181570.

Office Action from Korean Patent Office in corresponding KR Application No. 10-2017-0181570, dated Dec. 27, 2019.

Examination Report to the corresponding Indian Patent Application rendered by the Indian Patent Office (CGPDTM) dated May 20, 2020, 6 pages.

Office Action to the corresponding Japanese Patent Application rendered by the Japan Patent Office (JPO) dated Mar. 23, 2021, 6 pages (including English translation).

* cited by examiner

METHOD AND APPARATUS FOR DECIDING NUMEROLOGY IN A WIRELESS COMMUNICATION SYSTEM

CROSS-REFERENCE TO RELATED APPLICATIONS

The present Application claims the benefit of U.S. Provisional Patent Application Ser. No. 62/442,625 filed on Jan. 5, 2017, the entire disclosure of which is incorporated herein in its entirety by reference.

FIELD

This disclosure generally relates to wireless communication networks, and more particularly, to a method and apparatus for deciding numerology in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes receiving a first signaling, wherein the first signaling includes an identity of a broadcast or multicast service. The method further includes receiving a second signaling, wherein the second signaling indicates an association between a numerology and an information of the broadcast or multicast service. The method also includes using the numerology to receive the broadcast or multicast service.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.331 v14.0.0, "Evolved Universal Terrestrial Radio Access (E-UTRA); Radio Resource Control (RRC); Protocol specification"; TS 36.300 v14.0.0, "Evolved Universal Terrestrial Radio Access (E-UTRA) and Evolved Universal Terrestrial Radio Access Network (E-UTRAN); Overall description; Stage 2"; TR 22.864 v13.0.0, "Feasibility Study on New Services and Markets Technology Enablers—Network Operation; Stage 1"; TR 22.891 v14.2.0, "Feasibility Study on New Services and Markets Technology Enablers"; TS 22.261 v0.1.1, "Service requirements for next generation new services and markets; Stage 1"; TR 38.913 v14.0.0, "Study on Scenarios and Requirements for Next Generation Access Technologies"; TS 22.146 v13.0.0, "Multimedia Broadcast/Multicast Service (MBMS); Stage 1"; TS 22.246 v13.0.0, "Multimedia Broadcast/Multicast Service (MBMS) user services; Stage 1"; TS 23.246 v14.1.0, "Multimedia Broadcast/Multicast Service (MBMS); Architecture and functional description"; TS 26.346 v14.1.0, "Multimedia Broadcast/Multicast Service (MBMS); Protocols and codecs"; TR 36.890 v13.0.0, "Study on single-cell point-to-multipoint transmission for E-UTRA"; R2-168529, Intel, "System information acquisition procedure"; R2-167480, OPPO, "Discussion on Issues of Other SIs"; R2-168738, LG, "Efficient SI request for other SI"; TR 38.804 v0.4.0, "Study on New Radio Access Technology; Radio Interface Protocol Aspects"; and TS 23.003 v14.2.0, "Numbering, addressing and identification".

Furthermore, the exemplary wireless communication systems devices described below may be designed to the wireless technology discussed in various documents, including: NGMN 5G White Paper v1.0.

The standards and documents listed above are hereby expressly incorporated by reference in their entirety.

Figure 1:
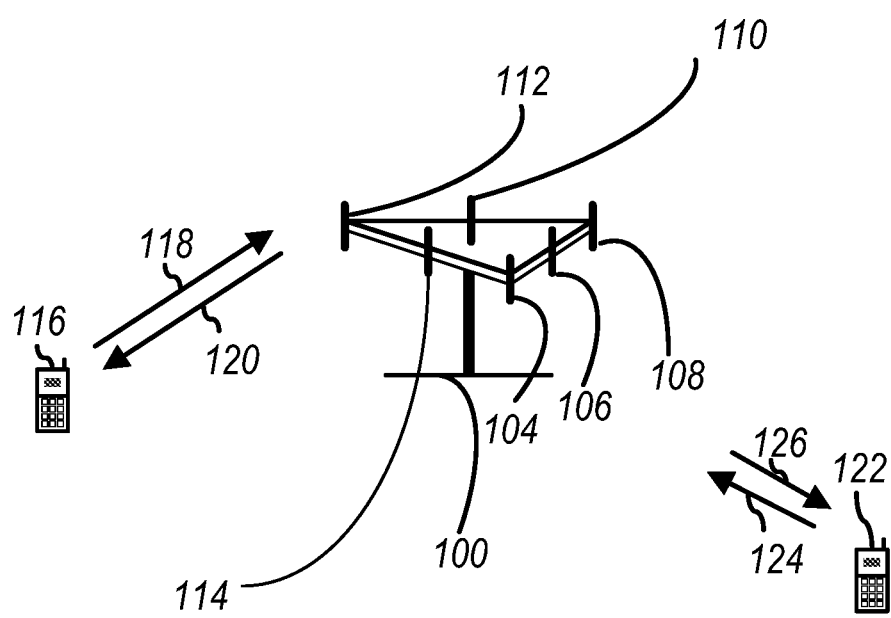
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
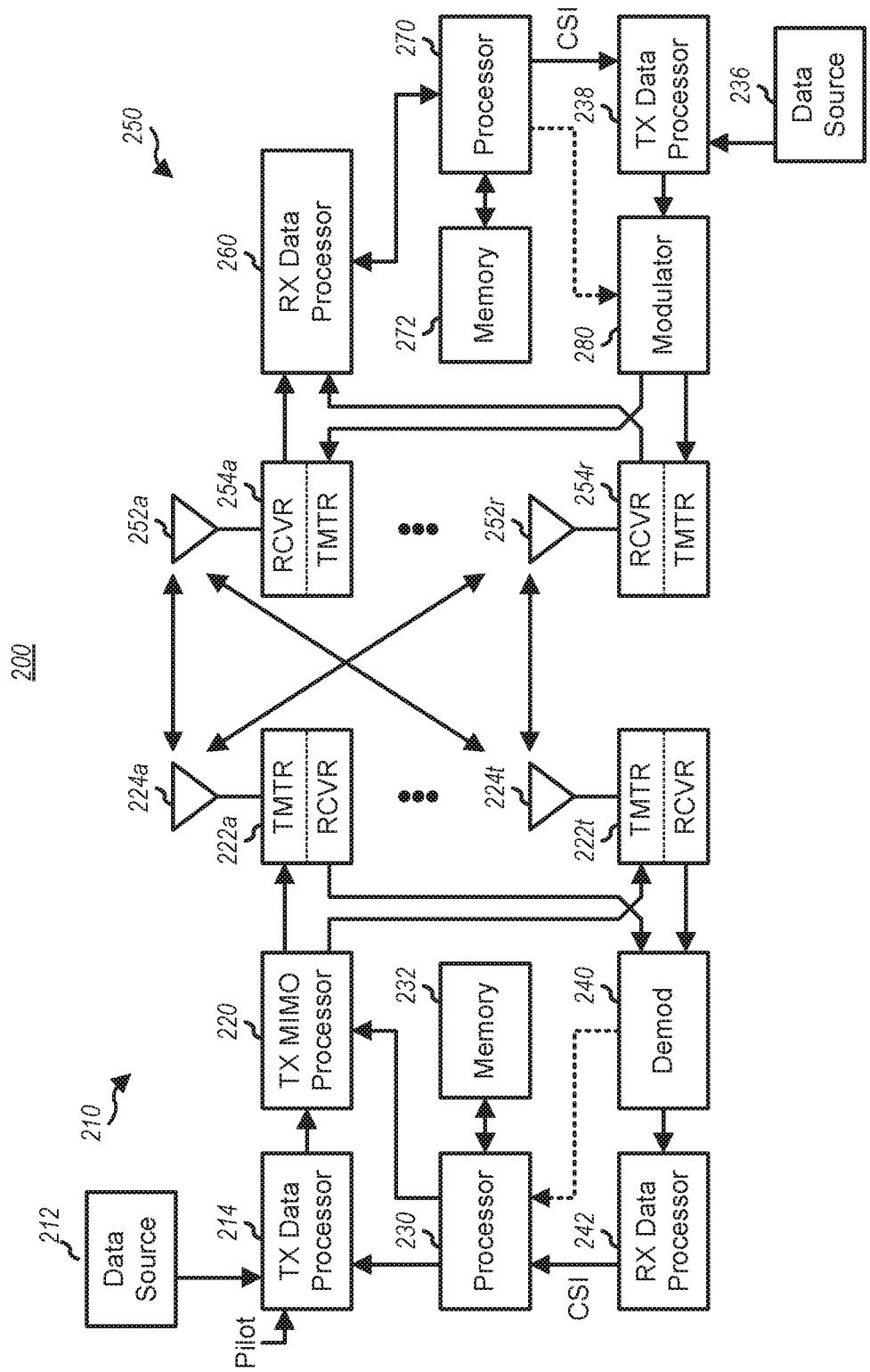
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
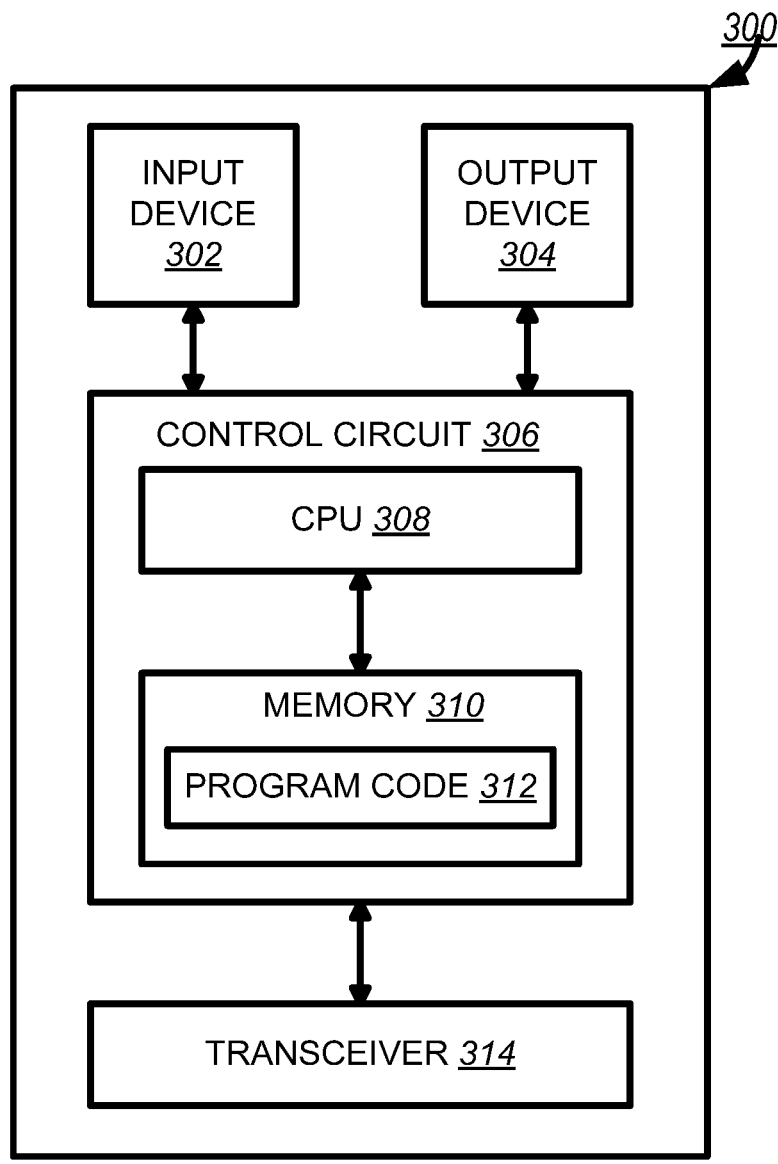
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
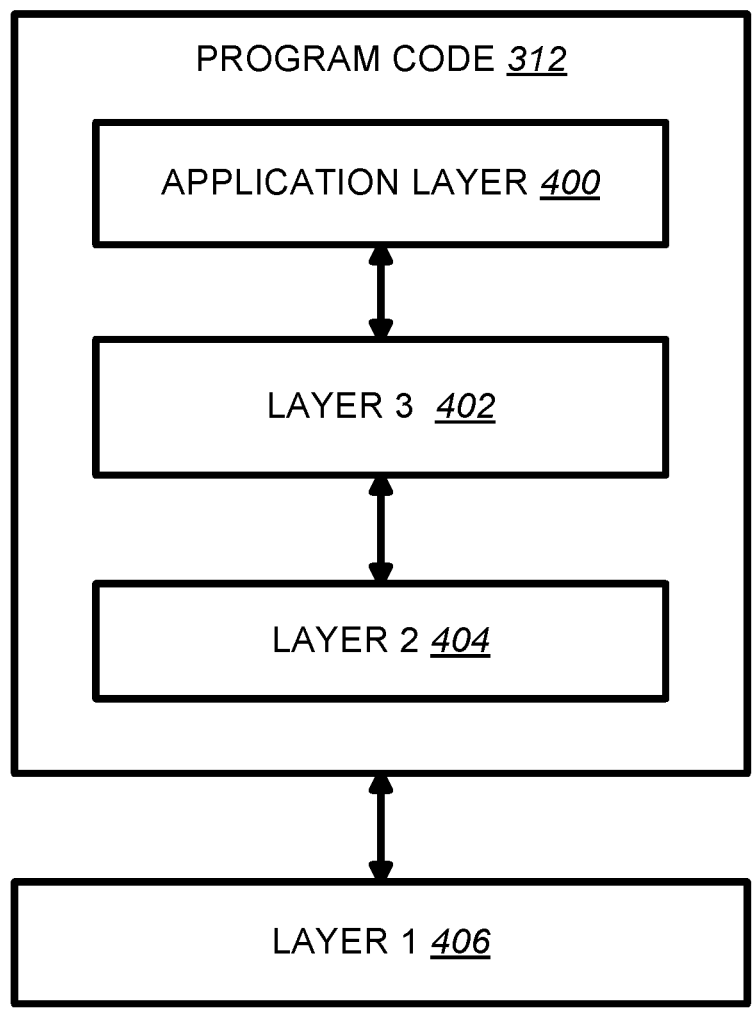
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR system, the Layer 2 portion 404 may include a Radio Link Control (RLC) layer and a Medium Access Control (MAC) layer. The Layer 3 portion 402 may include a Radio Resource Control (RRC) layer.

In general, the broadcast or multicast technologies in legacy LTE are discussed in 3GPP TS 22.146, TS 22.246, TS 23.246, TS 26.346, and TR 36.890.

For broadcast or multicast in NR, some related use cases are described in TR 22.891 as follows:

5.56 Broadcasting Support
5.56.1 Description
The system shall be able to support an enhanced form of MBMS that includes transmission of scheduled linear time Audio and Audio & Video programmes.
Pre-Conditions
Both Mobile and Network support an enhanced and flexible form of MBMS.
The Network has previously allocated MBMS resources.
Service Flows
 1. A 3GPP device accesses an advertised MBMS service for broadcast information via a broadcast management system.
 2. The mobile downloads the 3GPP resource group nomination (e.g. a channel code) for the cell that they are camped on for this broadcast channel from the broadcast management system.
 3. The User keys in the channel code and starts receiving the broadcast channel subject to any authorisation.

5.57 Ad-Hoc Broadcasting
5.57.1 Description
MBMS and eMBMS have been defined in UMTS and LTE. However take-up has been poor. There are established terrestrial and satellite digital broadcast capabilities as well as evolving IP-TV content delivery systems whether linear or replay based. There is also a thriving video blog market via IP.

However, there is a demand for good quality event based content broadcasting over and above IP web pages and video snippets.

This use case proposes the ability to setup event based video content broadcasting, using a slice of the local or temporary 3GPP system in the environ of the event.

The event in this context may not be limited to purely sporting or entertainment, but may be a truly ad-hoc video broadcast that interested parties want to see based on a social web advert.

The envisaged difference for this use case for future 3GPP systems as compared to today is that the video content in this case, may be live and may not ever be stored on a video server in the network but may be only transmitted as a 'one-off' by either a broadcast organisation or an individual. It is envisaged that in order to support this capability, a future mobile unit is operated to provide the video source content and then a DEDICATED resource budget is allocated in a given area or area(s) to enable multicast broadcast to other mobiles when their users elect to receive the content via a 3GPP Ad-Hoc MBMS service.

The benefits are that this is a dynamic way to efficiently broadcast video content on an ad-hoc basis as opposed to a user uploading and then each user separately downloading from a server or group communications point.

Pre-Conditions
The source broadcasting mobile has an internet connection over the 3GPP system and video camera/codec capabilities on their phone.
The recipient broadcast received mobiles have the ability to connect to an Ad-Hoc MBMS group.
Service Flows
 1. A fixed or mobile 3GPP device user (individual and/or organisation) makes a request that they want to broadcast a video via an Ad-Hoc-MBMS social/operator provided broadcast request management system. The requester specifies the title, description, duration, format and 'scope' of the broadcast. Scope is specified in terms of locale and radius of desired broadcast coverage and mapped at the service centre to a single cell or number of cells that support the requested locale/range.
 2. Alternatively the broadcast requester may be another type of device that is fixed connected to the internet and has access to the broadcast request management system.
 3. The Ad-Hoc-MBMS application is operated by a host machine or sub-system which has a new interface towards the 3GPP system to make a request for ad-hoc resources for broadcasting the content. (N.B: this service could be chargeable).
 4. The operator network element responsible for ad-hoc broadcast requests responds to the broadcaster request and if possible allocates local resources scheduled at a future time to broadcast the content as a 'broadcast opportunity window'.

5. The broadcast requester accepts the opportunity and the operator network element schedules MBMS resources for a given area scope specified in the original request.
6. The broadcast event is added to the ad-hoc broadcast channel programme guide (e.g. on a web page) that is part of the Ad-hoc MBMS service manager. Each broadcast event is given a code for the broadcast receiving devices to select to identify the MBMS resources to 'tune in to' to listen to the ad-hoc broadcast.
7. If the broadcast is for a single cell ad-hoc broadcast then, at the broadcast opportunity start time, the mobile broadcast requester broadcasts the ad-hoc broadcast content to the users in the locale directly, on the resources scheduled by the network earlier.
8. For multiple cell ad-hoc broadcasts, the cell that the broadcast requester is camped-on, also receives the broadcast and relays the stream to other adjacent cells listed in the scope request over the core network for rebroadcast on the resources identified at each adjacent cell in the list.

Post-Conditions

Resources operated to support the Ad-Hoc MBMS broadcast are released back into the pool for each cell where the ad-hoc broadcast was staged.

5.70 Broadcast/Multicast Services Using a Dedicated Radio Carrier 5.70.1 Description The massive growth in mobile broadband services over the last few years has caused regulatory bodies across the world to consider re-allocating some of the UHF spectrum, because of its superior propagation characteristics, for mobile broadband services. This could potentially cause displacement of smaller/rural TV broadcasters and make them look at alternate delivery models (e.g. channel sharing, delivery via mobile broadband, etc.). The NGMN whitepaper [2] has considered that 5G systems could substitute or complement radio/television broadcast services.

As a potential new business opportunity, wireless operators could deploy an overlay 3GPP network using dedicated spectrum for the broadcast service to serve the customers affected by displacement of smaller broadcasters within a geographic area.

Alternatively, a new wireless entrant could deliver a stand-alone broadcast/multicast only service over a large geographic area by deploying less number of sites with greater coverage area.

Consider a use case where Operator A has deployed a 3GPP system using frequency f1 in urban geographic area where demand for the mobile broadband service, and therefore the capacity need is the highest. Operator A decides to introduce a new broadcast/multicast service either on its own or in partnership with another broadcast/multicast service provider. The service is expected to be made available over a much wider area than its existing 3GPP system.

Wireless operator A deploys an overlay over its existing 3GPP system to create a single frequency network with few sites, each covering a wide geographic area. In order to ensure it can accommodate a wide variety of broadcast/multicast content simultaneously, wireless operator A uses a dedicated frequency, f2, to deploy the broadcast/multicast service.

As a result of this overlay deployment users in urban area X can simultaneously receive existing broadband data services (on f1) as well as the new broadcast/multicast service (on f2). Users in suburban/rural areas Y and Z only receive the new broadcast/multicast service.

Use cases for broadcast or multicast in NR are also described in 3GPP TR 22.864 as follows:

5 Use Case Families 5.1 System Flexibility

[ . . . ]

Flexibility Enabler 4: Flexible Broadcast Service

A flexible broadcast service (e.g., an enhanced form of MBMS), allows the users to receive linear time audio as well as audio and video programmes such as 4 k UHD. The user is able to select the expected broadcast program from the broadcaster's management system. Another new possible broadcast service is a truly ad-hoc video broadcast that interested parties want to see based on a social web advert, and the video content may be live and may not ever be stored on a video server in the network but may be only transmitted as a 'one-off' by either a broadcast organisation or an individual.

Today, 3GPP specifications do not allow a stand-alone deployment of a multicast/broadcast network. Additionally, the current implementation limits the radio resources that can be allocated for multicast/broadcast service to 60%. It also limits the coverage size of the radio base station to a relatively small value. In order to support a variety of linear video based services for the users, deployment of the next generation of multicast/broadcast capabilities will require significantly more flexibility than what is available in the current network in terms of configuration, resource allocation and network deployment to support broadcast/multicast services. The flexibility required encompasses allocation of resources, multicast/broadcast network design as well as simultaneous user access to unicast data and broadcast service.

In addition, use cases for broadcast or multicast are described in NGMN 5G White Paper as follows:

Broadcast-Like Services

While personalization of communication will lead to a reducing demand for legacy broadcast as deployed today, e.g. linear TV, the fully mobile and connected society will nonetheless need efficient distribution of information from one source to many destinations. These services may distribute content as done today (typically only downlink), but also provide a feedback channel (uplink) for interactive services or acknowledgement information. Both, real-time or non-real time services should be possible. Furthermore, such services are well suited to accommodate vertical industries' needs. These services are characterized by having a wide distribution which can be either geo-location focused or address-space focused (many end-users).

xviii. News and Information

Beyond 2020, receiving text/pictures, audio and video, everywhere and as soon as things happen (e.g., action or score in a football match) will be common. Customers in specific areas should simultaneously receive appropriate news and information regardless of the device they are using and their network connection.

xix. Local Broadcast-Like Services

Local services will be active at a cell (compound) level with a reach of for example 1 to 20 km. Typical scenarios include stadium services, advertisements, voucher delivery, festivals, fairs, and congress/convention. Local emergency services can exploit such capabilities to search for missing people or in the prevention or response to crime (e.g. theft).

xx. Regional Broadcast-Like Services

Broadcast-like services with a regional reach will be required, for example within 1 to 100 km. A typical scenario includes communication of traffic jam information. Regional emergency warnings can include disaster warnings. Unlike the legacy broadcast service, the feedback channel can be used to track delivery of the warning message to all or selected parties.

xxi. National Broadcast-Like Services

National or even continental/world-reach services are interesting as a substitute or complementary to broadcast services for radio or television. Also vertical industries will benefit from national broadcast like services to upgrade/distribution of firmware. The automotive industry may leverage the acknowledgement broadcast capability to mitigate the need for recall campaigns. This requires software patches to be delivered in large scale, and successful updates to be confirmed and documented via the feedback channel.

The post-2020 outlook, shown throughout the use cases above, is extremely broad in terms of variety of applications and variability of their performance attributes. The use case families shown earlier represent both enriched service categories and also prospects for numerous new services. Note that some may have overlaps.

Progress of NR study in RAN2 is captured in 3GPP TR 38.804. A RAN controlled RRC state, called RRC_INACTIVE, could be considered in NR as follows:

5.2 Radio Interface Protocol Architecture

For NR, a technology of aggregating NR carriers is studied. Both lower layer aggregation like Carrier Aggregation (CA) for LTE (see [3]) and upper layer aggregation like DC are investigated. From layer 2/3 point of view, aggregation of carriers with different numerologies is supported in NR. Modelling aspects such as whether it is a single or multiple MAC entity is FFS.

5.5.3 System Information Handling

Figure 5:
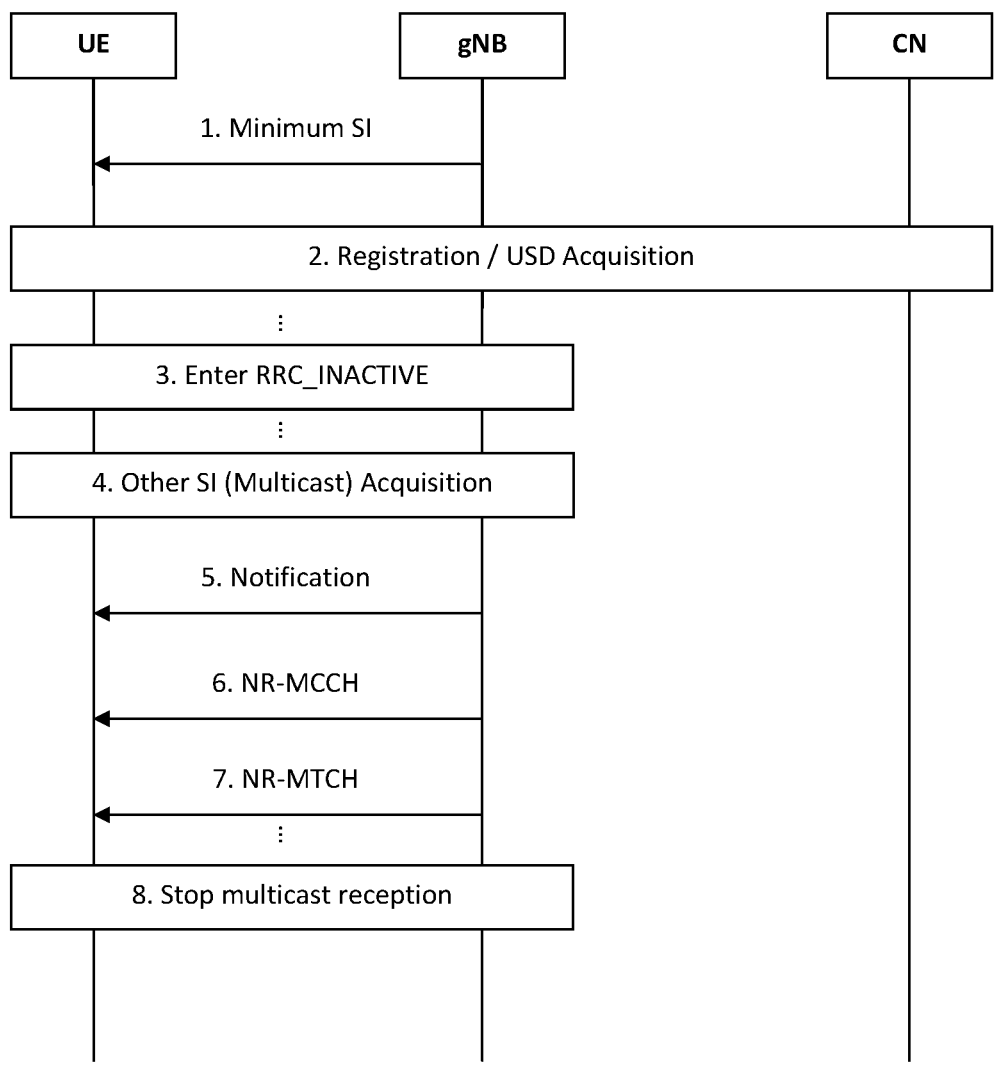
FIG. 5 is a diagram according to one exemplary embodiment.

System information is divided into minimum SI and other SI. Minimum SI is periodically broadcast. The minimum SI comprises basic information required for initial access to a cell and information for acquiring any other SI broadcast periodically or provisioned via on-demand basis. The other SI encompasses everything not broadcast in the minimum SI. The other SI may either be broadcast, or provisioned in a dedicated manner, either triggered by the network or upon request from the UE as illustrated in Figure 5.5.3.1.2-1. For the other SI required by the UE, before the UE sends the other SI request the UE needs to know whether it is available in the cell and whether it is broadcast or not (e.g. by checking the minimum SI). The UE in RRC_IDLE or RRC_INACTIVE should be able to request the other SI without requiring a state transition. The other SI may be broadcast at configurable periodicity and for certain duration. PWS information can be classified into the other SI.

A.2 User Plane Aspects

The eNB should have means to control which logical channels the UE may map to which numerology and/or TTIs with variable duration. Details FFS (e.g. whether semi-static or dynamic, hard split/soft split, etc).

A UE can support multiple numerologies from a single cell. FFS whether this is modelled as 1 or multiple MAC entities.

A.4 RRC

With regards to RRC states related considerations (to be captured in sub-clause 5.5.2):

Study the introduction of a RAN controlled "state" characterised by, at least:
 a) UEs in RAN controlled state should incur minimum signalling, minimise power consumption, minimise resource costs in the RAN/CN making it possible to maximise the number of UEs utilising (and benefiting from) this state.
 b) Able to start data transfer with low delay (as required by RAN requirements).
FFS whether data transfer is by leaving the "state" or data transfer can occur within the "state".
FFS whether "state" translates to an RRC state.
Potential characteristics of the RAN controlled "state" for study:
 a) The CN/RAN connection is maintained.
 b) AS context stored in RAN.
 c) Network knows the UE's location within an area and UE performs mobility within that area without notifying the network.
 d) RAN can trigger paging of UEs which are in the RAN controlled "inactive state".
 e) No dedicated resources.
RRC states with significantly overlapping characteristics should be avoided.
At least one RRC state for low activity should meet the NR control plane latency requirement and must be capable of achieving comparable power efficiency to that of LTE's IDLE state.
One UE has only one NR RRC state at one time.
The connection (both CP and UP) between RAN and Core should be maintained in the "new state".
 FFS whether the "new state" can be transparent to Core.
For the UE in the "new state", a RAN initiated notification procedure should be used to reach UE. And the notification related parameters should be configured by RAN itself.
 FFS how the notification will be transmitted (e.g. via a beam, broadcast, etc.).
For the UE in the "new state", RAN should be aware whenever the UE moves from one "RAN-based notification area" to another.
 FFS how CN location updates and RAN updates interact, if needed.
Agree that, in the 'new state' there will be a mechanism where the UE first transits to the full connected state where data transmission can occur.
RAN2 will study the possibility for the UE to perform data transmission without state transition from the 'new state' to be fully connected.

With regards to system information provisioning (to be captured in sub-clause 5.5.3):

Other mechanisms than periodic broadcast of system information should be studied during study item.
Agree on the terminology of Minimum SI (at least for purpose of the SI discussions).
Minimum SI needs to be broadcasted periodically.
Contents and format of minimum SI are FFS. Content will at least include information to support cell selection, for acquiring other SI, for accessing the cell.
 FFS Whether all "cells"/TRPs periodically broadcast the minimum SI.
Agree on the terminology of Other SI where other SI comprises everything not broadcasted in minimum SI.

FFS Whether ETWS/CMAS like information would be considered as Other SI or Minimum SI.

Both network triggered and UE initiated mechanisms for Other SI delivery shall be further studied.

It is network decision whether other SI is broadcasted or delivered through UE-specific signalling.

Requirements related to broadcast or multicast in new RAT, also called New Radio, are discussed in 3GPP TR 38.913 as follows:

9.1 Multimedia Broadcast/Multicast Service

The new RAT shall support existing Multicast/Broadcast services (e.g. download, streaming, group communication, TV, etc.) and new services (e.g. V2X, etc).

The new RAT shall support dynamic adjustment of the Multicast/Broadcast area based on e.g. the user distribution or service requirements.

The new RAT shall support concurrent delivery of both unicast and Multicast/Broadcast services to the users.

The new RAT shall support efficient multiplexing with unicast transmissions in at least frequency domain and time domain.

The new RAT shall support static and dynamic resource allocation between Multicast/Broadcast and unicast; the new RAT shall in particular allow support of up to 100% of DL resources for Multicast/Broadcast (100% meaning a dedicated MBMS carrier).

The new RAT shall support Multicast/Broadcast network sharing between multiple participating MNOs, including the case of a dedicated MBMS network.

The new RAT shall make it possible to cover large geographical areas up to the size of an entire country in SFN mode with network synchronization and shall allow cell radii of up to 100 km if required to facilitate that objective. It shall also support local, regional and national broadcast areas.

The new RAT shall support Multicast/Broadcast services for fixed, portable and mobile UEs. Mobility up to 250 km/h shall be supported.

The new RAT shall leverage usage of RAN equipment (hard- and software) including e.g. multi-antenna capabilities (e.g. MIMO) to improve Multicast/Broadcast capacity and reliability.

The new RAT shall support Multicast/Broadcast services for mMTC devices.

MBMS (Multimedia Broadcast Multicast Service) related system information in LTE were introduced in 3GPP TS 36.331 as follows:

SystemInformationBlockType2

The IE SystemInformationBlockType2 contains radio resource configuration information that is common for all UEs.

NOTE: UE timers and constants related to functionality for which parameters are provided in another SIB are included in the corresponding SIB.

| SystemInformationBlockType2 information element |
| --- |

```
-- ASN1START
SystemInformationBlockType2 ::=    SEQUENCE {
    ...
    mbsfn-SubframeConfigList        MBSFN-SubframeConfigList
```

```
    OPTIONAL,   -- Need OR
    ...
...
MBSFN-SubframeConfigList ::= SEQUENCE (SIZE (1..maxMBSFN-
Allocations)) OF MBSFN-SubframeConfig
```

| SystemInformationBlockType2 field descriptions |
| --- |
| mbsfn-SubframeConfigList |
| Defines the subframes that are reserved for MBSFN in downlink. NOTE 1. |

SystemInformationBlockType13

The IE SystemInformationBlockType13 contains the information required to acquire the MBMS control information associated with one or more MBSFN areas.

| SystemInformationBlockType13 information element |
| --- |

```
-- ASN1START
SystemInformationBlockType13-r9 ::=  SEQUENCE {
    mbsfn-AreaInfoList-r9       MBSFN-AreaInfoList-r9,
    notificationConfig-r9       MBMS-NotificationConfig-r9,
    lateNonCriticalExtension    OCTET STRING
    OPTIONAL,
    ...
}
-- ASN1STOP
```

| SystemInformationBlockType13 field descriptions |
| --- |
| notificationConfig |
| Indicates the MBMS notification related configuration parameters. The UE shall ignore this field when dl-Bandwidth included in MasterInformationBlock is set to n6. |

SystemInformationBlockType15

The IE SystemInformationBlockType15 contains the MBMS Service Area Identities (SAI) of the current and/or neighbouring carrier frequencies.

| SystemInformationBlockType15 information element |
| --- |

```
-- ASN1START
SystemInformationBlockType15-r11 ::= SEQUENCE {
    mbms-SAI-IntraFreq-r11              MBMS-SAI-List-r11
    OPTIONAL, -- Need OR
    mbms-SAI-InterFreqList-r11          MBMS-SAI-InterFreqList-r11
    OPTIONAL, -- Need OR
    lateNonCriticalExtension            OCTET STRING
    OPTIONAL,
    ...,
    [[mbms-SAI-InterFreqList-v1140      MBMS-SAI-InterFreqList-
    v1140 OPTIONAL -- Cond InterFreq
    ]]
}
MBMS-SAI-List-r11 ::=           SEQUENCE (SIZE (1..maxSAI-
MBMS-r11)) OF MBMS-SAI-r11
MBMS-SAI-r11 ::=                INTEGER (0..65535)
MBMS-SAI-InterFreqList-r11 ::=      SEQUENCE (SIZE (1..maxFreq))
OF MBMS-SAI-InterFreq-r11
MBMS-SAI-InterFreqList-v1140 ::=    SEQUENCE (SIZE (1..maxFreq))
OF MBMS-SAI-InterFreq-v1140
MBMS-SAI-InterFreq-r11 ::=      SEQUENCE {
    dl-CarrierFreq-r11              ARFCN-ValueEUTRA-r9,
    mbms-SAI-List-r11               MBMS-SAI-List-r11
}
MBMS-SAI-InterFreq-v1140 ::=    SEQUENCE {
    multiBandInfoList-r11           MultiBandInfoList-r11
    OPTIONAL -- Need OR
}
```

-continued

-- ASN1STOP

| SystemInformationBlockType15 field descriptions |
| --- |
| mbms-SAI-InterFreqList |
| Contains a list of neighboring frequencies including additional bands, if any, that provide MBMS services and the corresponding MBMS SAIs. |
| mbms-SAI-IntraFreq |
| Contains the list of MBMS SAIs for the current frequency. A duplicate MBMS SAI indicates that this and all following SAIs are not offered by this cell but only by neighbour cells on the current frequency. For MBMS service continuity, the UE shall use all MBMS SAIs listed in mbms-SAI-IntraFreq to derive the MBMS frequencies of interest. |
| mbms-SAI-List |
| Contains a list of MBMS SAIs for a specific frequency. |
| multiBandInfoList |
| A list of additional frequency bands applicable for the cells participating in the MBSFN transmission. |

| Conditional presence | Explanation |
| --- | --- |
| InterFreq | The field is optionally present, need OR, if the mbms-SAI-InterFreqList-r11 is present. Otherwise it is not present. |

SystemInformationBlockType20

The IE SystemInformationBlockType20 contains the information required to acquire the control information associated transmission of MBMS using SC-PTM.

| SystemInformationBlockType20 information element |
| --- |
| -- ASN1START |
| SystemInformationBlockType20-r13 ::= SEQUENCE { |
|    sc-mcch-RepetionPeriod-r13    ENUMERATED {rf2, rf4, rf8, rf16, rf32, rf64, rf128, rf256}, |
|    sc-mcch-Offset-r13        INTEGER (0..10), |
|    sc-mcch-FirstSubframe-r13   INTEGER (0..9), |
|    sc-mcch-duration-r13     INTEGER (2..9) OPTIONAL, |
|    sc-mcch-ModificationPeriod-r13  ENUMERATED {rf2, rf4, rf8, rf16, rf32, rf64, rf128, rf256, |
|                                rf512, rf1024, r2048, rf4096, rf8192, rf16384, rf32768,                 rf65536}, |
|    lateNonCriticalExtension    OCTET STRING OPTIONAL, |
|    ... |
| } |
| -- ASN1STOP |

| SystemInformationBlockType20 field descriptions |
| --- |
| sc-mcch-ModificationPeriod |
| Defines periodically appearing boundaries, i.e. radio frames for which SFN mod sc-mcch-ModificationPeriod = 0. The contents of different transmissions of SC-MCCH information can only be different if there is at least one such boundary in-between them. Value rf2 corresponds to 2 radio frames, value rf4 corresponds to 4 radio frames and so on. |
| sc-mcch-duration |
| Indicates, starting from the subframe indicated by sc-mcch-FirstSubframe, the duration in subframes during which SC-MCCH may be scheduled in PDCCH sub-frames, see TS 36.321 [6]. Absence of this IE means that SC-MCCH is only scheduled in the subframe indicated by sc-mcch-FirstSubframe. |
| sc-mcch-Offset |
| Indicates, together with the sc-mcch-RepetitionPeriod, the radio frames in which SC-MCCH is scheduled i.e. SC-MCCH is scheduled in radio frames for which: SFN mod sc-mcch-RepetitionPeriod = sc-mcch-Offset. |
| sc-mcch-FirstSubframe |
| Indicates the first subframe in which SC-MCCH is scheduled |
| sc-mcch-RepetitionPeriod |
| Defines the interval between transmissions of SC-MCCH information, in radio frames. Value rf2 corresponds to 2 radio frames, rf4 corresponds to 4 radio frames and so on. |

One or more of the following terminologies may be used hereinafter:

gNB: The base station in 5G New Radio (NR) could be referred to as gNB.

NR-DTCH: A channel used to convey packet(s) of unicast service(s) in NR. It may be the same as or similar to DTCH in LTE.

Low-end UE: A UE does not support simultaneously communicate with network via more than a number of numerologies. The number may be one.

MBMS Service Area: The area within which data of a specific MBMS session are sent. Each individual MBMS session of an MBMS Bearer Service may be sent to a different MBMS Service Area (SA) as discussed in 3GPP TS 23.246. A cell could belong to one or more MBMS SAs, and therefore is addressable by one or more MBMS Service Area Identities (SAIs) as discussed in 3GPP TS 23.003.

NR-MCCH: A channel used to convey control information related to broadcast or multicast service(s) in NR. It may be the same as or similar to MCCH or SC-MCCH in LTE as discussed in 3GPP TS 36.331.

NR-MCH: A channel used to convey packet(s) from NR-MCCH and NR-MTCH.

NR-MTCH: A channel used to convey packet(s) of broadcast or multicast service(s) in NR. It may be the same as or similar to MTCH or SC-MTCH in LTE as discussed in 3GPP TS 36.331.

Broadcast or multicast service: Packet(s) of a broadcast or multicast service is provided to multiple UEs at once via broadcast or multicast manner. It may be MBMS service, V2X service, or for download, streaming, group communication, or TV.

Numerology: It could refer to a set of parameters which are used to define a frame structure and/or subframe structure. The set of parameters may include at least sub-carrier spacing, symbol length, CP length, and/or TTI length.

Interest indication for broadcast or multicast: A indication used to notify the gNB that the UE is interested in reception of broadcast or multicast service(s). The indication may provide information related to the broadcast or multicast service(s) that the UE is interested in, e.g. frequency, service ID, and/or etc.

SI for broadcast or multicast: System information conveying configuration and/or information related to broadcast or multicast, e.g. configuration of NR-MCCH, configuration of NR-MCCH change notification, information of MBSFN area, information of broadcast or multicast service area, and/or etc. The SI may carry some or all of parameters carried by system information for MBMS in LTE, e.g. SystemInformationBlockType13, SystemInformationBlockType15, and/or SystemInformationBlockType20 as discussed in 3GPP TS 36.331.

TMGI: A TMGI can be used to identify one broadcast or multicast bearer service inside one PLMN in LTE as discussed in 3GPP TS 23.246.

TTI: A scheduling unit in time domain. TTI length is related to length of slot and/or symbol associated with the TTI, and/or related to numerology associated with the TTI.

USD: In the USD, the application/service layer provides for each broadcast or multicast service the identity (e.g., TMGI in LTE), the session start and end time, the frequencies and/or etc. In LTE, USD further provides the MBMS service area identities belonging to the MBMS service area as discussed in 3GPP TR 36.300.

Bandwidth part: It could be defined by a frequency location (e.g., center frequency) and a bandwidth. It could be a part of a carrier (e.g., bandwidth of the bandwidth part could be smaller or equal to carrier bandwidth of the carrier). One bandwidth part could be associated with one numerology.

In one scenario, the UE may be stationary while the UE is receiving a broadcast or multicast service that the UE is interested in. In addition, it is assumed that the broadcast or multicast service may not be started soon after reception of USD and the UE may not have any activated unicast service. An example of a flow chart of the scenario could be illustrated in FIG. 5 and explained below.

Step 1. When a UE is power on, the UE performs cell selection and then camps on a serving cell. The UE receives the Minimum SI from a gNB of the serving cell. Based on the Minimum SI, the UE could know if other SI related to broadcast or multicast service is available in this cell.

Step 2. The UE performs initial attach to the network and enters RRC_CONNECTED, and the related registration and authorization/authentication could be completed. The UE may establish a PDN connection with a broadcast or multicast service entity in the core network, and acquire USD information from the broadcast or multicast service entity.

Step 3. The gNB may send a RRC state change command to transit the UE from RRC_CONNECTED to RRC_INACTIVE, e.g., because the UE may not have any ongoing unicast services.

Step 4. To receive broadcast or multicast services, the UE may need to know related configurations for reception of broadcast or multicast service before the broadcast or multicast service that the UE is interested in is about to start. The related configurations could be provided in a system information. The system information could be provided in an Other SI. To trigger the gNB to provide the Other SI, the UE may send a request (e.g. a RRC message or a MAC control element) to the gNB for this purpose. Then, the UE receives the Other SI from the gNB.

Step 5. The UE starts to monitor a notification used to indicate change of control information on NR-MCCH. If the notification is received, the UE receives new control information on NR-MCCH.

Step 6. The UE may be aware of start of the broadcast or multicast service(s) that the UE is interested in or need of a broadcast or multicast counting based on the new control information received on NR-MCCH. Based on received control information, the UE knows configurations related to how to receive broadcast or multicast service on NR-MTCH.

Step 7. Based on the control information on NR-MCCH (and NR-MCH scheduling information), the UE receives NR-MTCH(s) related to the broadcast or multicast service(s) that the UE is interested in.

Step 8. The UE stops monitoring broadcast or multicast when the UE is no longer interested in any broadcast or multicast service or session of all interested broadcast or multicast service is stopped.

Figure 6:
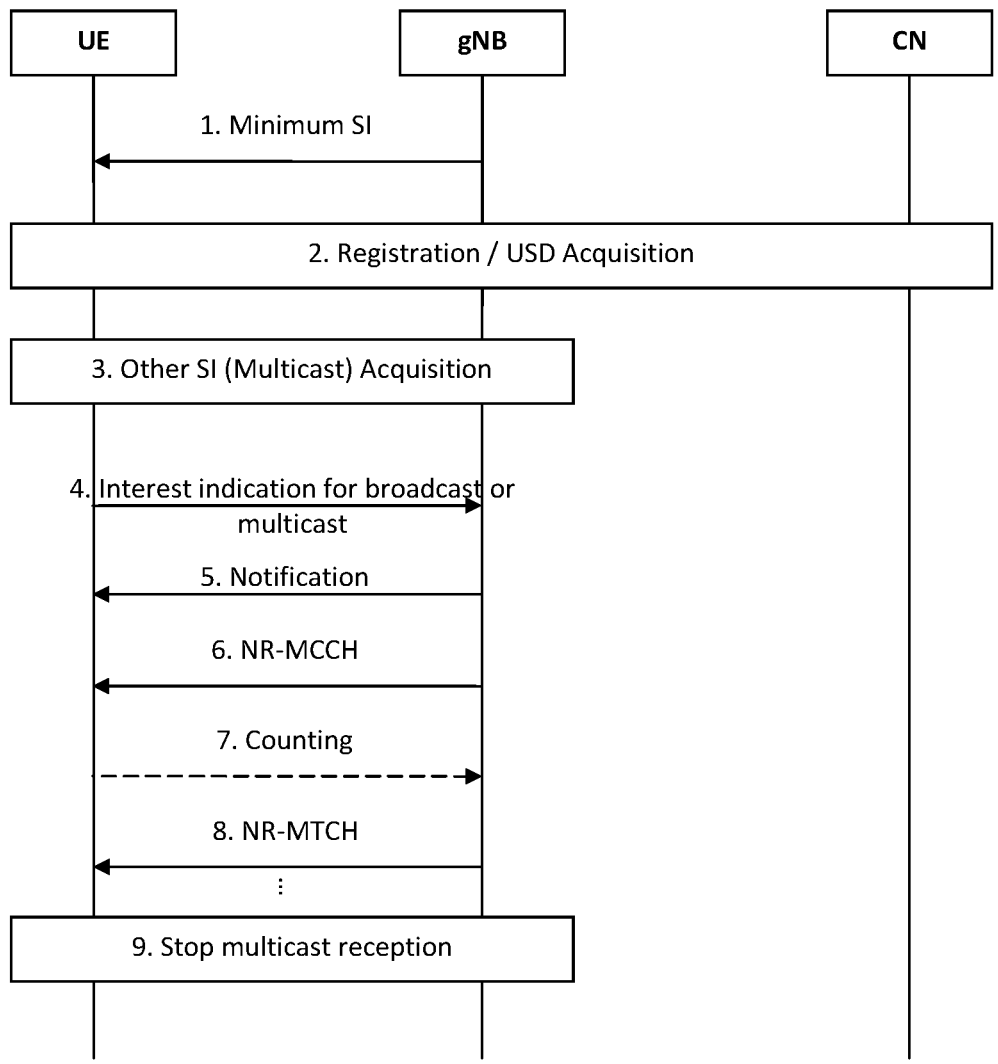
FIG. 6 is a diagram according to one exemplary embodiment.

In one scenario, a UE may be stationary while the UE is receiving a broadcast or multicast service that the UE is interested in. In addition, it is assumed that the broadcast or multicast service may be already ongoing or may be started soon after reception of USD and/or the UE may have activated unicast service(s). An example of a flow chart of the scenario could be illustrated in FIG. 6 and explained as below.

Step 1. When a UE is power on, the UE performs cell selection and then camps on a suitable cell. The UE receives the Minimum SI from a gNB of the suitable cell. Based on the Minimum SI, the UE could know if Other SI related to broadcast or multicast service is available in this cell.

Step 2. The UE performs initial attach to the network and enters RRC_CONNECTED, and the related registration and authorization/authentication could be completed. The UE may establish a PDN connection with a broadcast or multicast service entity in the core network, and acquire USD information from the broadcast or multicast service entity.

Step 3. In order to receive broadcast or multicast service, the UE may need to know related configurations for reception of broadcast or multicast service. The related configurations could be provided in a system information. The system information could be provided in an Other SI.

In order to trigger the gNB to provide the Other SI, the UE may send a request (e.g., a RRC message or a MAC control element) to the gNB for this purpose. Then, the UE receives the Other SI from the gNB.

The UE sends an interest indication for broadcast or multicast to the gNB in order to guarantee reception of the broadcast or multicast service that the UE is interested in.

Step 4. The UE starts to monitor a notification used to indicate change of control information on NR-MCCH. If the notification is received, the UE receives new control information on NR-MCCH.

Step 5. The UE may be aware of start of the broadcast or multicast service(s) that the UE is interested in or need of a broadcast or multicast counting based on the new control information received on NR-MCCH. Based on received control information, the UE would know configurations related to how to receive broadcast or multicast service on NR-MTCH.

Step 6. If the UE is requested for counting of the broadcast or multicast service that the UE is interested in, the UE may send a counting response to the gNB.

Step 7. Based on the control information on NR-MCCH (and NR-MCH scheduling information), the UE receives NR-MTCH(s) related to the broadcast or multicast service(s) that the UE is interested in.

Step 8. The UE stops monitoring broadcast or multicast when the UE is no longer interested in any broadcast or multicast service or session of all interested broadcast or multicast service is stopped.

Since different broadcast or multicast services may require different QoS, it is beneficial for NR to support different broadcast or multicast services using different numerologies. To achieve successful transmission of broadcast or multicast service, understanding of the numerology used by a broadcast or multicast service should be the same between gNB and UEs. How to align the understanding should be considered.

There are several alternatives to decide the numerology as follows:
- Numerology for a broadcast or multicast service is provided in USD
- Numerology for a broadcast or multicast service is provided via NR-MCCH
- Numerology for a NR-MCH is provided via NR-MCCH
- Numerology for a NR-MCH is provided in Other SI
- Numerology for a TTI is provided via NR-MCCH
- Numerology for a MBSFN area is provided in Other SI
- Numerology for a MBMS service area is provided in Other SI
- Numerology for a NR-MCCH is provided in Other SI and numerology for a broadcast or multicast service is the same as that used by the associated NR-MCCH
- QoS or group of a broadcast or multicast service is provided in USD and numerology for the QoS or the group is provided in Other SI
- QoS or group of a broadcast or multicast service is provided in USD and numerology for the QoS or the group is provided via NR-MCCH
- A bandwidth part used to carry a broadcast or multicast service is provided in USD and numerology for the bandwidth part is provided in Other SI A bandwidth part used to carry a broadcast or multicast service is provided in USD and numerology for the bandwidth part is provided via NR-MCCH.

Details of each alternative is described below.

The numerology used by NR-MCCH (e.g., numerology used to transmit transport block from the NR-MCCH) could be: (i) a default numerology (e.g., used by minimum SI), (ii) a specific numerology which is the same as the numerology used by the broadcast or multicast service, or (iii) a specific numerology indicated by minimum SI or Other SI (for broadcast or multicast).

Figure 7:
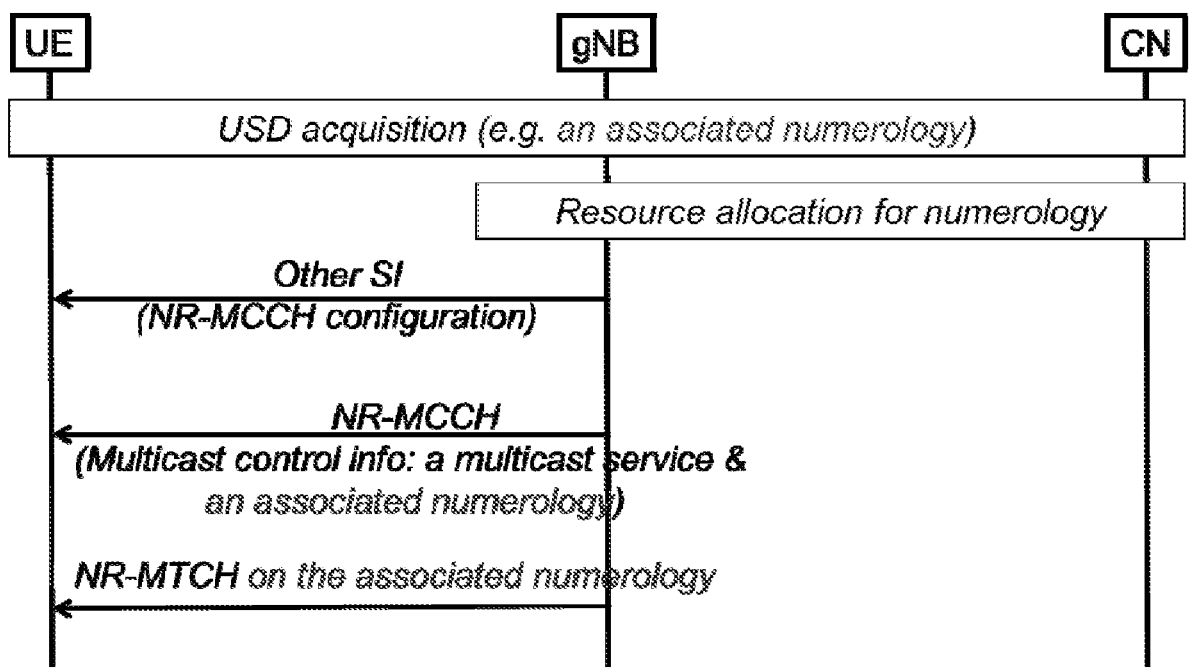
FIG. 7 is a diagram according to one exemplary embodiment.
Figure 10:
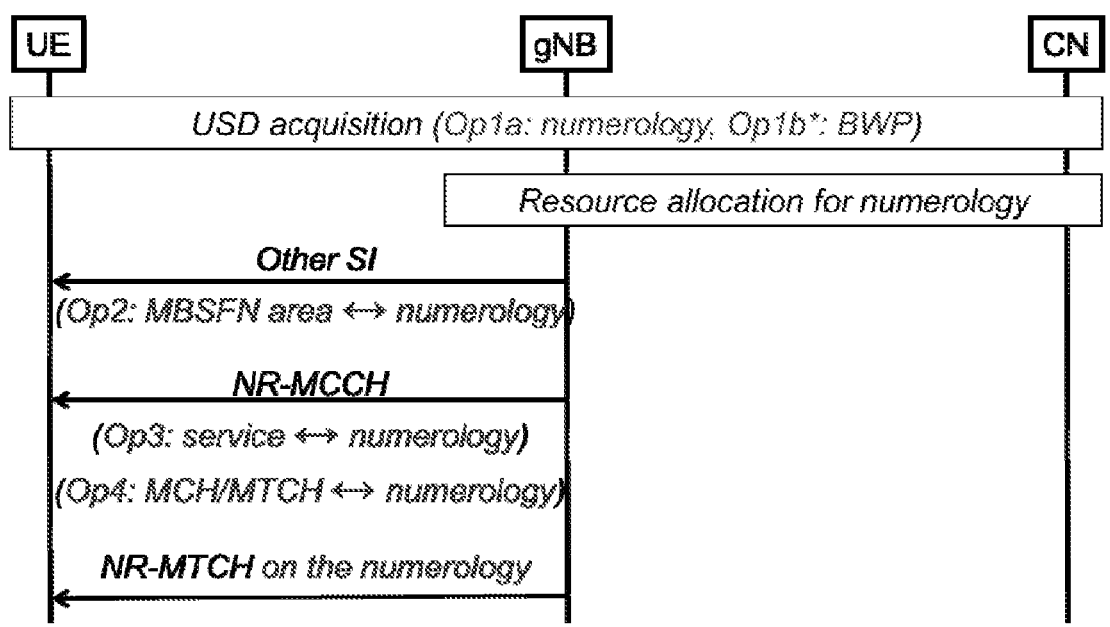
FIG. 10 is a diagram according to one exemplary embodiment.

In one alternative, each broadcast or multicast service could be associated with one numerology and/or a bandwidth part. The information of this association could be provided together with configuration of the broadcast or multicast service (e.g., identity) configuration for radio access, scheduling, or etc. The information of this association could be provided by core network (e.g., MCE in LTE) to a gNB. The information of this association could be provided to an UE via NR-MCCH (because the information is a radio resource parameter) or via application layer signaling used to indicate the UE about information of broadcast or multicast service(s), related numerology information, and/or bandwidth part information (e.g., using the broadcast or multicast user service discovery/announcement procedure in upper layers as discussed in 3GPP TS 26.346). An example of this alternative could be illustrated in FIG. 7 and FIG. 10.

If the information of the association is provided in USD, one or multiple of following steps may be performed:
- The UE may acquire the USD from core network. The USD may include identity of broadcast or multicast service.
- The UE may acquire SI for broadcast or multicast, e.g., via dedicated signalling on the default numerology or a specific numerology decided by gNB or via broadcasted signalling on the default numerology or a specific numerology based on Minimum SI. The SI for broadcast or multicast may include configurations of reception of notification and/or NR-MCCH. The configuration of reception of NR-MCCH may indicate a set of resource allocation (e.g., frame(s), subframe(s), symbol(s), and/or slot(s)) where the UE can receive NR-MCCH. The configuration of reception of notification may indicate a set of resource allocation (e.g., frame(s), subframe(s), symbol(s), and/or slot(s)) where the UE can receive notification. The SI for broadcast or multicast may further indicate a numerology (e.g., the default numerology or a specific numerology) for reception of notification. The SI for broadcast or multicast may also indicate a numerology (e.g., the default numerology or a specific numerology) for reception of NR-MCCH. The numerology used for reception of notification may be same as or different from the numerology used for reception of NR-MCCH. A system information (e.g., the SI for broadcast or multicast) may indicate association between a bandwidth part and a numerology used for receiving NR-MCCH and/or NR-MTCH.
- The UE may receive NR-MCCH information on the NR-MCCH based on the SI for broadcast or multicast. The NR-MCCH information may include configuration(s) of NR-MCH. The configuration of NR-MCH may include association between the identity of broadcast or multicast service (e.g., TMGI) and the identity of NR-MTCH (e.g., LCID). The configuration of NR-MCH may indicate a set of resource allocation (e.g., frame(s), subframe(s), symbol(s), and/or slot(s)) where the UE can receive NR-MCH scheduling information and/or NR-MTCH associated with broadcast or multicast service that the UE is interested in.
- The UE may receive NR-MTCH based on (NR-MCH scheduling information and) the configuration of NR-MCH. The numerology used to receive the NR-MTCH could be based on the USD. The numerology used to receive the NR-MTCH could be derived from the USD and a system information (e.g., the SI for broadcast or multicast). The numerology used to receive the NR-MTCH could be derived from the USD and/or pre-configuration. The system information or the pre-configuration could indicate that the numerology used to receive the NR-MTCH is associated with a bandwidth part indicated in the USD. The numerology used to receive the NR-MTCH could be indicated in a MAC control element (e.g., NR-MCH scheduling information MAC control element). The MAC control element could be received on a first transmission occasion, subframe, or scheduling unit of the NR-MTCH.

If the information of the association is provided in NR-MCCH, one or multiple of following steps may be performed:
- The UE may acquire USD from core network. The USD may include identity of broadcast or multicast service. The USD may not include any information indicating a numerology for each broadcast or multicast service.
- The UE may acquire SI for broadcast or multicast, e.g. via dedicated signalling on the default numerology or a specific numerology decided by gNB or via broadcasted signalling on the default numerology or a specific numerology based on Minimum SI. The SI for broadcast or multicast may include configurations of reception of notification and/or NR-MCCH. The configuration of reception of NR-MCCH may indicate a set of resource allocation (e.g., frames, subframes) where the UE can receive NR-MCCH. The configuration of reception of notification may indicate a set of resource allocation (e.g., frames, subframes) where the UE can receive notification. The SI for broadcast or multicast may further indicate a numerology (e.g., the default numerology or a specific numerology) for the reception of notification. The SI for broadcast or multicast may also indicate a numerology (e.g., the default numerology or a specific numerology) for the reception of NR-MCCH. The numerology used for the reception of notification may be same as or different from the numerology used for the reception of NR-MCCH.

The UE may receive NR-MCCH information on the NR-MCCH based on the SI for broadcast or multicast. The NR-MCCH information may include a set of resource allocation (e.g., frames/subframes). The NR-MCCH information may include configuration(s) of NR-MCH. Each configuration of NR-MCH may indicate where the UE can receive NR-MCH scheduling information and/or NR-MTCH associated with broadcast or multicast service that the UE is interested in within the set of resource allocation. The NR-MCCH information may indicate that each NR-MCH or a subset of the resource allocation (e.g., frame(s), subframe(s), symbol(s), and/or slot(s)) may be associated with a specific numerology. Each configuration of NR-MCH may include association between identify of broadcast or multicast service (e.g., TMGI) and identity of NR-MTCH (e.g., LCID). Alternatively, each configuration of NR-MCH may include association between identity of broadcast or multicast service (e.g., TMGI) and a specific numerology or association between identify of NR-MTCH (e.g., LCID) and a specific numerology.

The UE may receive NR-MTCH based on (NR-MCH scheduling information and) the configuration of NR-MCH. The numerology used to receive the NR-MTCH is based on the NR-MCCH information.

Alternatively, the UE may receive NR-MTCH using a numerology as same as the UE receives NR-MCCH information, e.g., without any information indicating a specific numerology in the NR-MCCH information. The numerology used to receive the NR-MCCH information may be based on the SI for broadcast or multicast. The numerology used to receive the NR-MCCH information may also be derived from the USD and a system information (e.g., the SI for broadcast or multicast). In addition, the numerology used to receive the NR-MCCH information may be derived from the USD and/or pre-configuration. The system information or the pre-configuration could indicate that the numerology used to receive the NR-MCCH is associated with a bandwidth part indicated in the USD.

Figure 8:
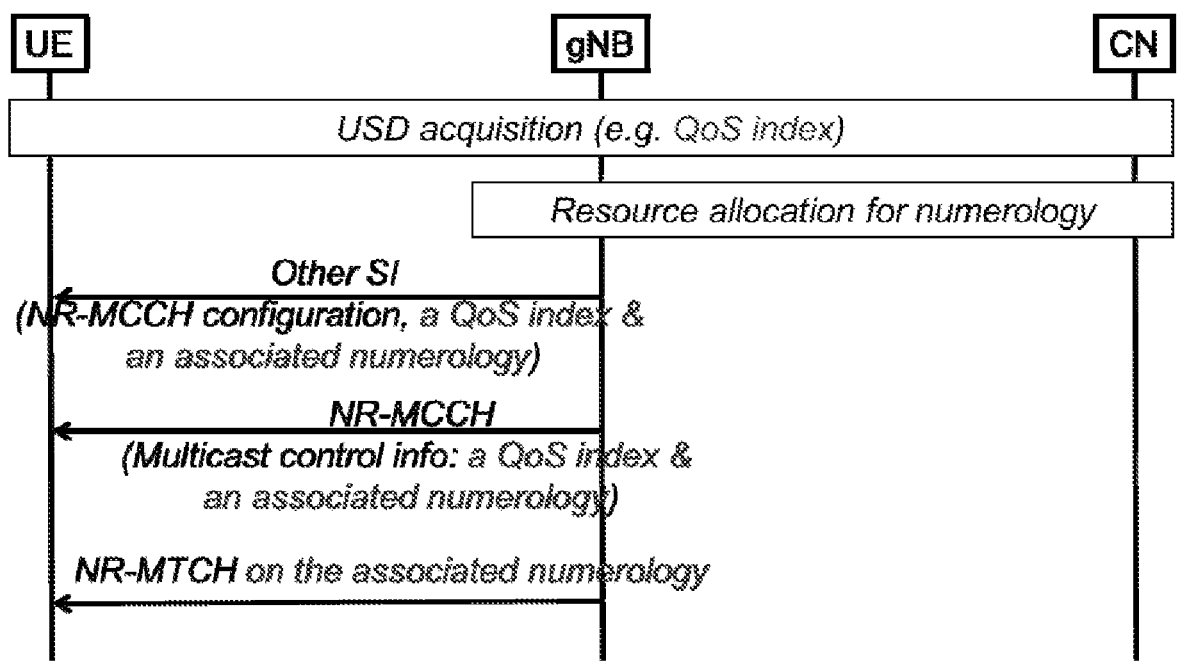
FIG. 8 is a diagram according to one exemplary embodiment.
Figure 11:
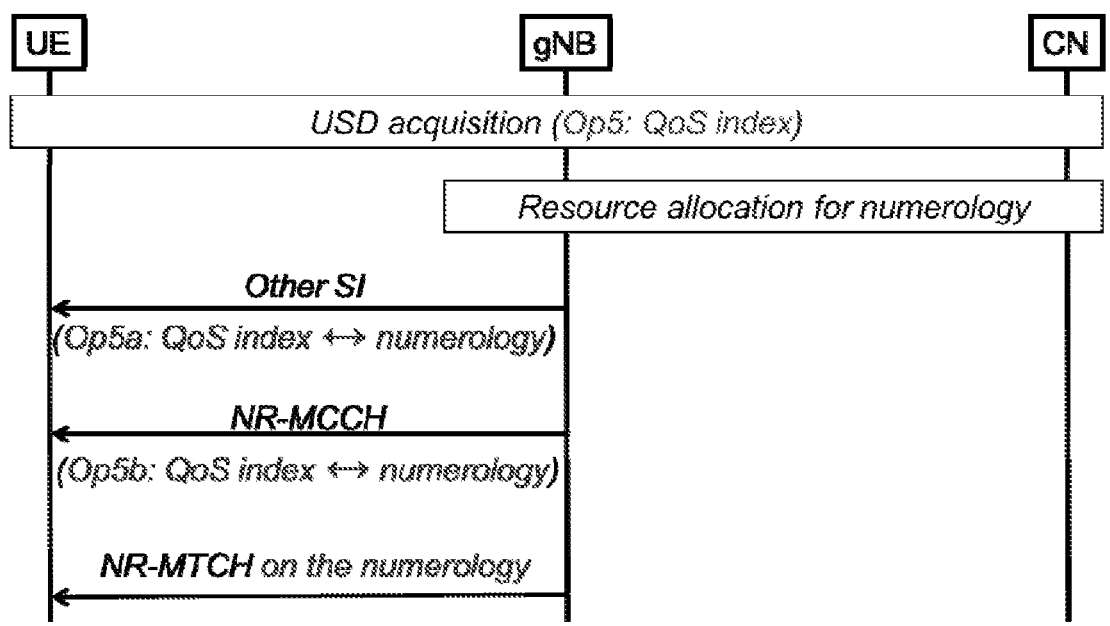
FIG. 11 is a diagram according to one exemplary embodiment.

In another alternative, broadcast or multicast services with same QoS could be grouped together, e.g., with a group ID, QoS index, MBMS SAI, or a MBSFN area ID. And one group could be associated with a specific numerology, e.g., the association may be provided in system information, e.g., other SI for broadcast or multicast, or NR-MCCH. In this alternative, numerology doesn't need to be indicated per broadcast or multicast service. Group information of a broadcast or multicast service could be explicitly or implicitly indicated to an UE via broadcast or multicast user service discovery/announcement procedure in upper layers (e.g., USD). Information of the association between the group and the specific numerology could be provided by core network (e.g., MCE in LTE) to a gNB. An example of this alternative could be illustrated in FIG. 8 and FIG. 11.

One or multiple of following steps may be performed:

The UE may acquire USD from core network. The USD may include identity of broadcast or multicast service. The USD may or may not include an indication used to derive a specific numerology for a broadcast or multicast service. The indication could be an identity of QoS, an identity of broadcast or multicast area (e.g., MBSFN area ID), an identity of broadcast or multicast service area (e.g., MBSFN service area ID or MBMS service area ID), an identity of a group, or etc.

The UE may acquire SI for broadcast or multicast, e.g., via dedicated signalling on the default numerology or a specific numerology decided by gNB or via broadcasted signalling on the default numerology or a specific numerology based on Minimum SI. The SI for broadcast or multicast may include configurations of reception of notification and/or NR-MCCH. The configuration of reception of NR-MCCH may indicate a set of resource allocation (e.g., frame(s), subframe(s), symbol(s), and/or slot(s)) where the UE can receive NR-MCCH. The configuration of reception of notification may also indicate a set of resource allocation (e.g., frame(s), subframe(s), symbol(s), and/or slot(s)) where the UE can receive notification. The SI for broadcast or multicast may further indicate a numerology (e.g., the default numerology or a specific numerology) for the reception of notification. The SI for broadcast or multicast may indicate a numerology (e.g., the default numerology or a specific numerology) for the reception of NR-MCCH. The numerology used for the reception of notification may be same as or different from the numerology used for the reception of NR-MCCH. The SI for broadcast or multicast may indicate association between the indication and a specific numerology. For example, the SI for broadcast or multicast may indicate association between an identity of QoS and the specific numerology. The SI for broadcast or multicast may indicate association between an identity of broadcast or multicast area and the specific numerology. The SI for broadcast or multicast may indicate association between an identity of broadcast or multicast service area ID and the specific numerology. The SI for broadcast or multicast may indicate association between an identity of a group and the specific numerology.

The UE may receive NR-MCCH information on the NR-MCCH based on the SI for broadcast or multicast. The NR-MCCH information may include a set of resource allocation (e.g., frame(s), subframe(s), symbol(s), and/or slot(s)). The NR-MCCH information may also include configuration(s) of NR-MCH. Each configuration of NR-MCH may indicate where the UE can receive NR-MCH scheduling information and/or NR-MTCH associated with broadcast or multicast service that the UE is interested in within the set of resource allocation.

In addition, the NR-MCCH information may indicate an association between the indication and the specific numerology if the SI for broadcast or multicast does not indicate the association information. For example, the NR-MCCH information may indicate association between an identity of QoS and the specific numerology. The NR-MCCH information may indicate association between an identity of broadcast or multicast area and the specific numerology. The NR-MCCH information may also indicate association between an identity of broadcast or multicast service area and the specific numerology. The NR-MCCH information may further indicate association between an identity of a group and the specific numerology.

Furthermore, the NR-MCCH information may indicate that each configuration of NR-MCH or a subset of the resource allocation (e.g., frame(s), subframe(s), symbol(s), and/or slot(s)) may be associated with the indication. Each configuration of NR-MCH may include association between identify of broadcast or multicast service (e.g., TMGI) and identity of NR-MTCH (e.g., LCID).

Alternatively, each configuration of NR-MCH may include association between identity of broadcast or multicast service (e.g., TMGI) and the indication or association between identity of NR-MTCH (e.g., LCID) and the indication.

The UE may receive NR-MTCH based on (NR-MCH scheduling information and) the configuration of NR-MCH. The numerology used to receive the NR-MTCH is based on the indication.

Alternatively, the UE may receive NR-MTCH on a numerology as same as the UE receives NR-MCCH information, e.g., in case the indication is not provided in the USD. The numerology used to provide the NR-MCCH information is based on the SI for broadcast or multicast.

Alternatively, based on USD, the UE could know each broadcast or multicast service could be associated with, for example, the TMGI, the session start and end time, the frequencies and the broadcast or multicast service area identities (SAIs) belonging to the broadcast or multicast service area. The frequency included in the USD could be a carrier frequency of a cell providing the broadcast or multicast service or a set of physical resource blocks. Alternatively, the frequency included in the USD could be a frequency location or center frequency of a bandwidth part. The frequency could be associated with a bandwidth part or a carrier space.

Figure 9:
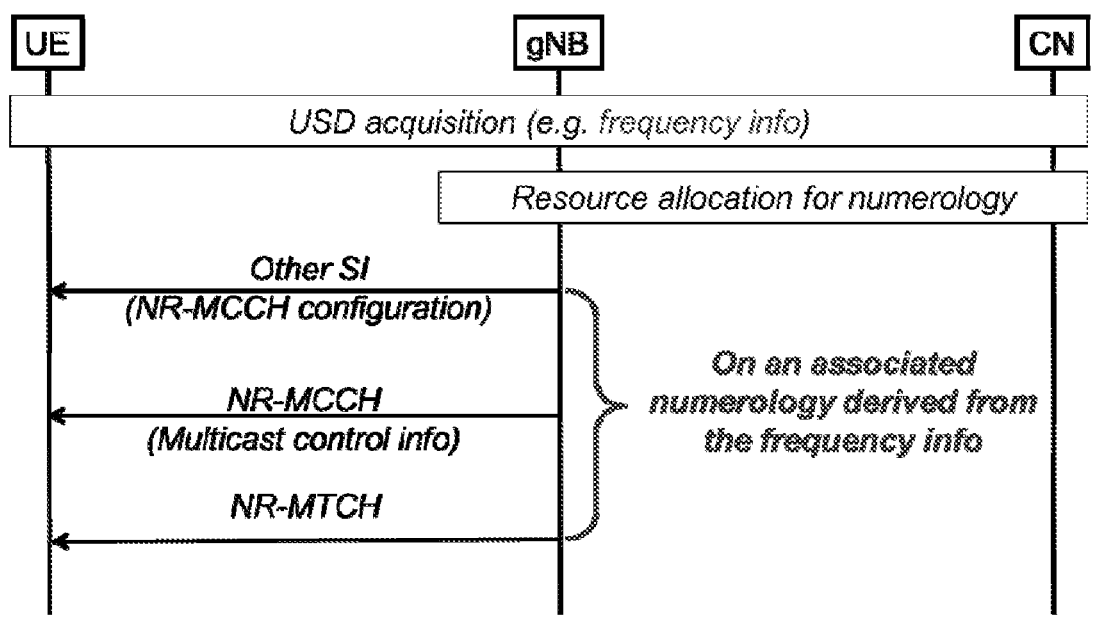
FIG. 9 is a diagram according to one exemplary embodiment.
Figure 12:
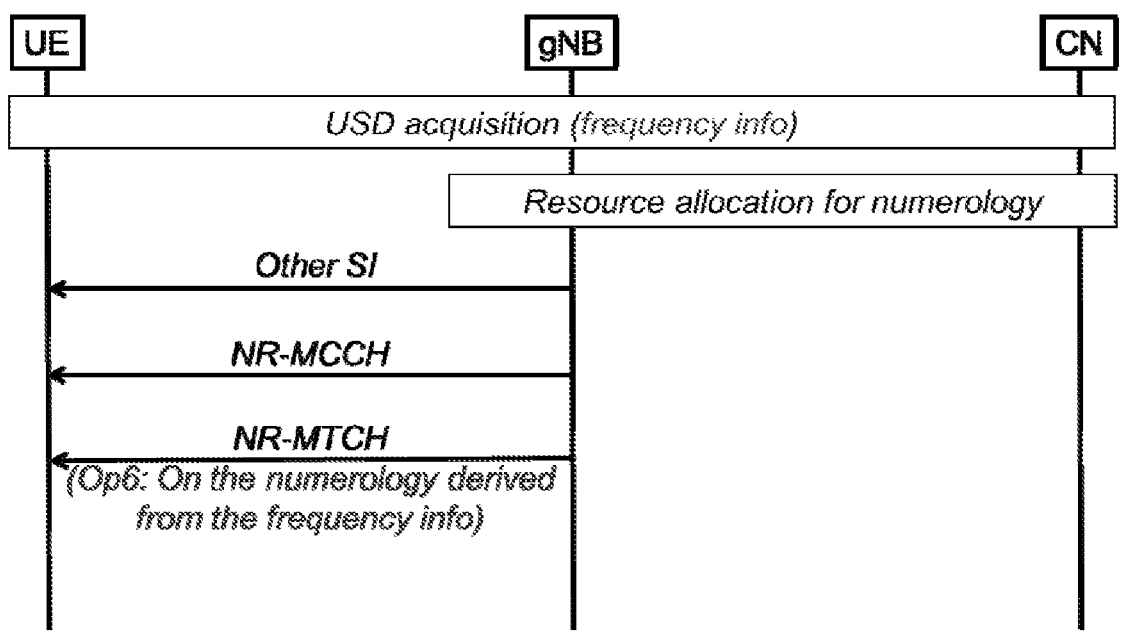
FIG. 12 is a diagram according to one exemplary embodiment.

Since each numerology could be associated with a bandwidth part or a carrier space, the frequency belonging to or associated with a bandwidth part or a carrier space for a broadcast or multicast service could be used to derive a corresponding numerology. The UE could be aware of the association between frequency and carrier space or the association between frequency and bandwidth part, e.g., via system information, the USD, or preconfiguration in the UE. The UE could be aware of the association between numerology and carrier space or the association between numerology and bandwidth part, e.g., via system information (e.g., Minimum SI) or via preconfiguration in the UE. The UE could determine an associated numerology in which the UE can receive a broadcast or multicast service that the UE is interested in based on the frequency associated with the broadcast or multicast service. An example of this alternative could be illustrated in FIG. 9 and FIG. 12.

The numerology used by NR-MCCH and/or the Other SI associated with the broadcast or multicast service could be: (1) a default numerology (e.g., used by minimum SI), (2) a specific numerology which is the same as the numerology used by the broadcast or multicast service, or (3) a specific numerology indicated by minimum SI.

Figure 13:
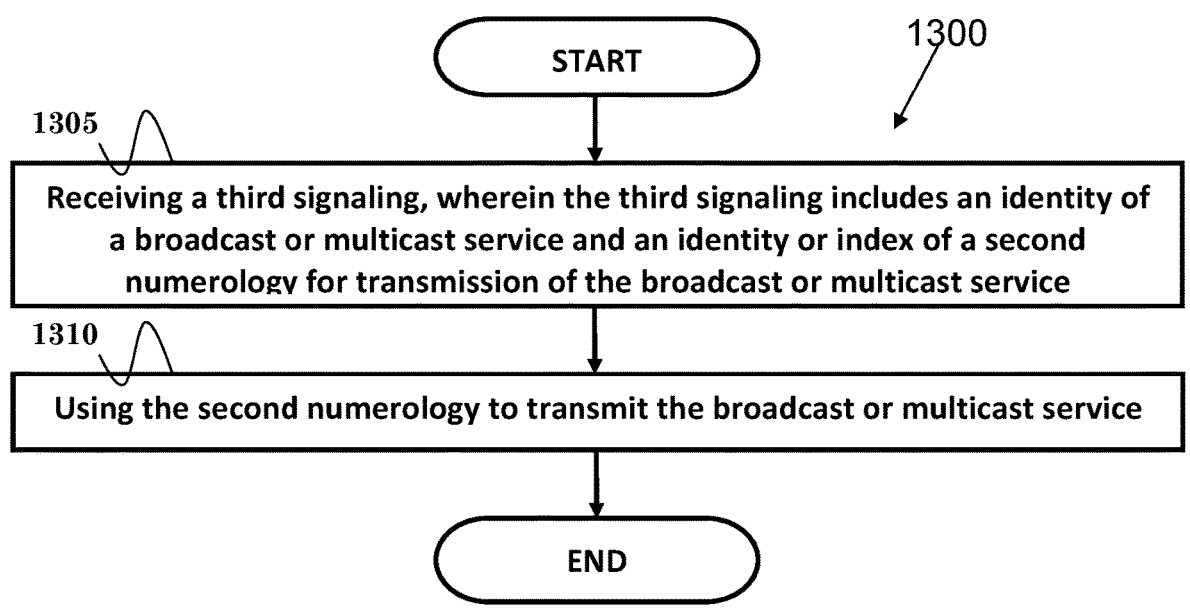
FIG. 13 is a flow chart according to one exemplary embodiment.

FIG. 13 is a flow chart 1300 according to one exemplary embodiment from the perspective of a base station. In step 1305, the base station receives a third signaling, wherein the third signaling includes an identity of a broadcast or multicast service and an identity or index of a second numerology for transmission of the broadcast or multicast service. In step 1310, the base station uses the second numerology to transmit the broadcast or multicast service.

Referring back to FIGS. 3 and 4, in one exemplary embodiment of a base station, the device 300 includes a program code 312 stored in the memory 310. The CPU 308 could execute program code 312 to enable the base station (i) to receive a third signaling, wherein the third signaling includes an identity of a broadcast or multicast service and an identity or index of a second numerology for transmission of the broadcast or multicast service, and (ii) to use the second numerology to transmit the broadcast or multicast service. Furthermore, the CPU 308 can execute the program code 312 to perform all of the above-described actions and steps or others described herein.

Figure 14:
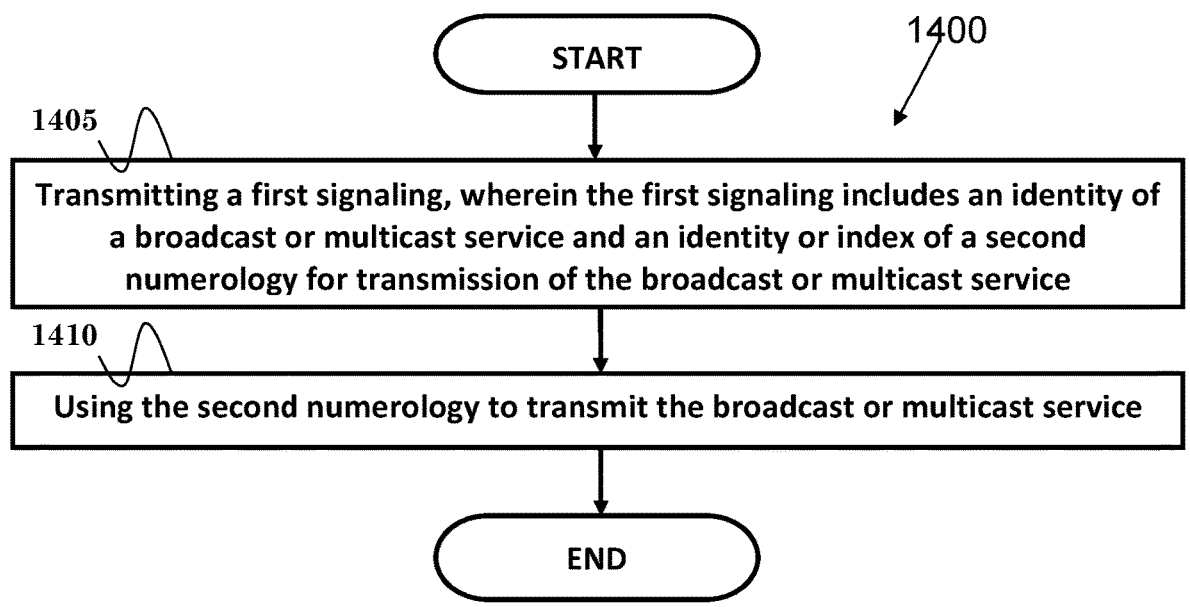
FIG. 14 is a flow chart according to one exemplary embodiment.

FIG. 14 is a flow chart 1400 according to one exemplary embodiment from the perspective of a base station. In step 1405, the base station transmits a first signaling, wherein the first signaling includes an identity of a broadcast or multicast service and an identity or index of a second numerology for transmission of the broadcast or multicast service. In step 1410, the base station uses the second numerology to transmit the broadcast or multicast service.

Referring back to FIGS. 3 and 4, in one exemplary embodiment of a base station, the device 300 includes a program code 312 stored in the memory 310. The CPU 308 could execute program code 312 to enable the base station (i) to transmit a first signaling, wherein the first signaling includes an identity of a broadcast or multicast service and an identity or index of a second numerology for transmission of the broadcast or multicast service, and (ii) to use the second numerology to transmit the broadcast or multicast service. Furthermore, the CPU 308 can execute the program code 312 to perform all of the above-described actions and steps or others described herein.

In the context of the embodiments illustrated in FIGS. 13 and 14 and discussed above, in one embodiment, the base station could transmit a system information for broadcast or multicast that includes a configuration for transmitting a second signaling. The configuration of transmitting the second signaling could include resource allocation (e.g., a set of frame(s), subframe(s), symbol(s), and/or slot(s)) on which the base station transmits the second signaling. The system information for broadcast or multicast could include an identity or index of a first numerology for transmission of the second signaling.

In one embodiment, the base station could transmit the second signaling, wherein the second signaling includes a configuration for transmitting the broadcast or multicast service. The configuration of transmitting the broadcast or multicast service could include resource allocation (e.g., a set of frame(s), subframe(s), symbol(s), and/or slot(s)) on which the base station transmits the broadcast or multicast service.

Figure 15:
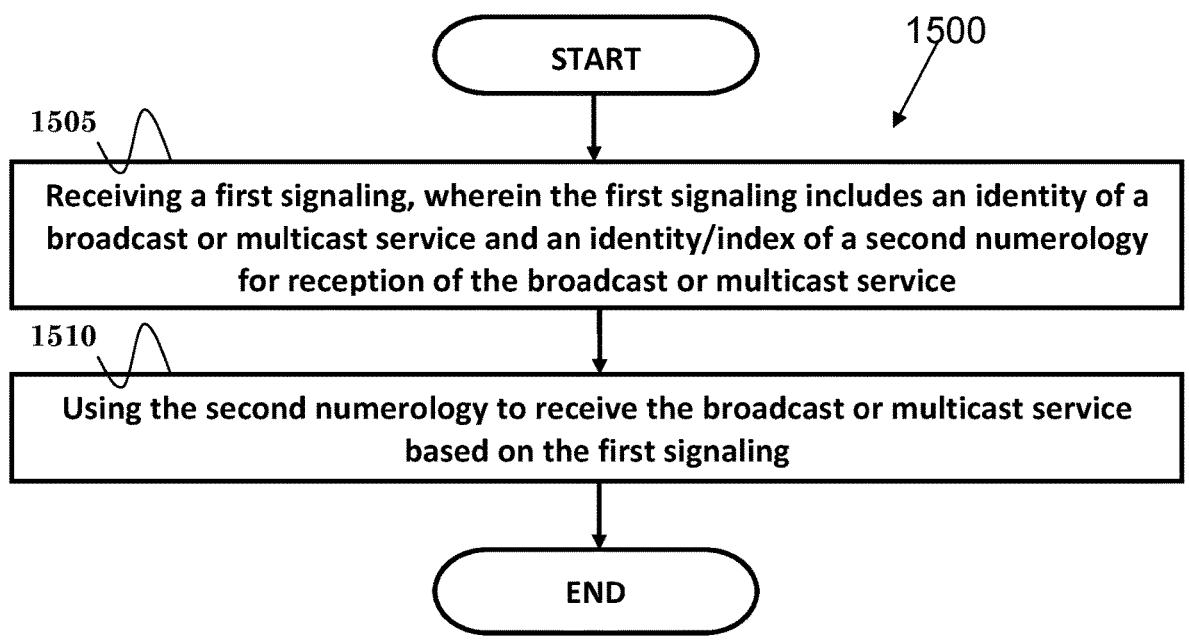
FIG. 15 is a flow chart according to one exemplary embodiment.

FIG. 15 is a flow chart 1500 according to one exemplary embodiment from the perspective of a UE. In step 1505, the UE receives a first signaling, wherein the first signaling includes an identity of a broadcast or multicast service and an identity/index of a second numerology for reception of the broadcast or multicast service. In step 1510, the UE uses the second numerology to receive the broadcast or multicast service based on the first signaling.

In one embodiment, the UE could receive a system information for broadcast or multicast including a configuration for receiving a second signaling. The configuration for receiving the second signaling could include resource allocation (e.g., a set of frame(s), subframe(s), symbol(s), and/or slot(s)) on which the UE receives the second signaling.

In one embodiment, the UE could receive the second signaling including a configuration for receiving the broadcast or multicast service. The configuration for receiving the broadcast or multicast service could include resource allocation (e.g., a set of frame(s), subframe(s), symbol(s), and/or slot(s)) on which the UE receives the broadcast or multicast service. The system information for broadcast or multicast could include an identity or index of a first numerology for reception of the second signaling.

Referring back to FIGS. 3 and 4, in one exemplary embodiment of a UE, the device 300 includes a program code 312 stored in the memory 310. The CPU 308 could execute program code 312 (*i*) to receive a first signaling, wherein the first signaling includes an identity of a broadcast or multicast service and an identity/index of a second numerology for reception of the broadcast or multicast service, and (ii) to use the second numerology to receive the broadcast or multicast service based on the first signaling. Furthermore, the CPU 308 can execute the program code 312 to perform all of the above-described actions and steps or others described herein.

Figure 16:
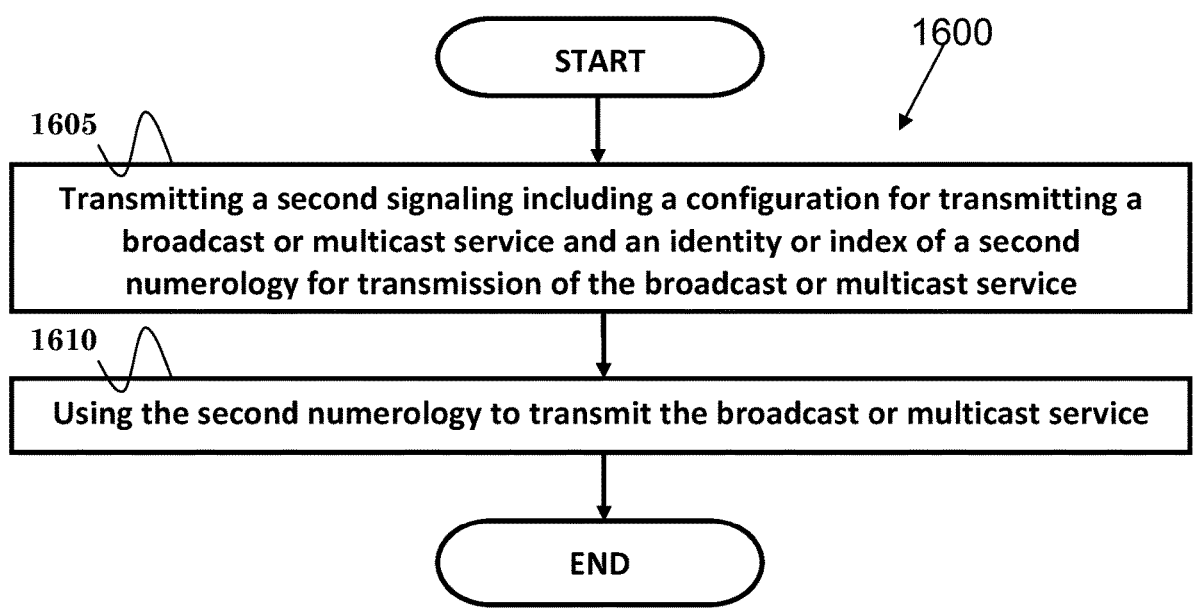
FIG. 16 is a flow chart according to one exemplary embodiment.

FIG. 16 is a flow chart 1600 according to one exemplary embodiment from the perspective of a base station. In step 1605, the base station transmits a second signaling including a configuration for transmitting a broadcast or multicast service and an identity or index of a second numerology for transmission of the broadcast or multicast service. The configuration for transmitting the broadcast or multicast service could include resource allocation (e.g., a set of frame(s), subframe(s), symbol(s), and/or slot(s)) on which the base station transmits the broadcast or multicast service. In step 1610, the base station uses the second numerology to transmit the broadcast or multicast service.

In one embodiment, the base station could transmit a first signalling, wherein the first signalling includes an identity of the broadcast or multicast service. Furthermore, the base station could transmit a system information for broadcast or multicast including a configuration of transmitting the second signalling. The configuration of transmitting the second signalling could include resource allocation (e.g., a set of frame(s), subframe(s), symbol(s), and/or slot(s)) on which the base station transmits the second signalling. The system information for broadcast or multicast could include an identity or index of a first numerology for transmission of the second signaling.

Referring back to FIGS. 3 and 4, in one exemplary embodiment of a base station, the device 300 includes a program code 312 stored in the memory 310. The CPU 308 could execute program code 312 (*i*) to transmit a second signaling including a configuration for transmitting a broadcast or multicast service and an identity/index of a second numerology for transmission of the broadcast or multicast service, and (ii) to use the second numerology to transmit the broadcast or multicast service. Furthermore, the CPU 308 can execute the program code 312 to perform all of the above-described actions and steps or others described herein.

Figure 17:
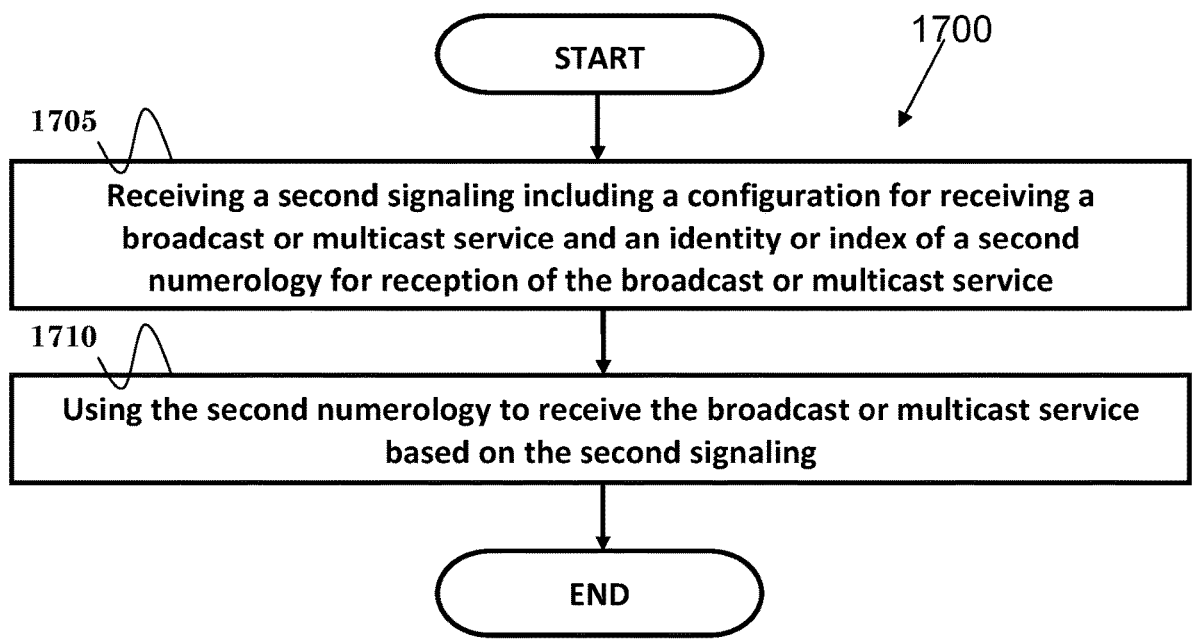
FIG. 17 is a flow chart according to one exemplary embodiment.

FIG. 17 is a flow chart 1700 according to one exemplary embodiment from the perspective of a UE. In step 1705, the UE receives a second signaling including a configuration for receiving a broadcast or multicast service and an identity or index of a second numerology for reception of the broadcast or multicast service. The configuration for receiving the broadcast or multicast service could include resource allocation (e.g., a set of frame(s), subframe(s), symbol(s), and/or slot(s)) on which the UE receives the broadcast or multicast service. In step 1710, the UE uses the second numerology to receive the broadcast or multicast service based on the second signaling.

In one embodiment, the UE could receive a first signaling, wherein the first signaling includes an identity of the broadcast or multicast service. The UE could also receive a system information for broadcast or multicast including a configuration for receiving the second signaling. The configuration of receiving the second signaling could include resource allocation (e.g., a set of frame(s), subframe(s), symbol(s), and/or slot(s)) on which the UE receives the second signaling. The system information for broadcast or multicast could include an identity or index of a first numerology for reception of the second signaling.

Referring back to FIGS. 3 and 4, in one exemplary embodiment of a UE, the device 300 includes a program code 312 stored in the memory 310. The CPU 308 could execute program code 312 (*i*) to receive a second signaling including a configuration for receiving a broadcast or multicast service and an identity or index of a second numerology for reception of the broadcast or multicast service, and (ii) to use the second numerology to receive the broadcast or multicast service based on the second signaling. Furthermore, the CPU 308 can execute the program code 312 to perform all of the above-described actions and steps or others described herein.

Figure 18:
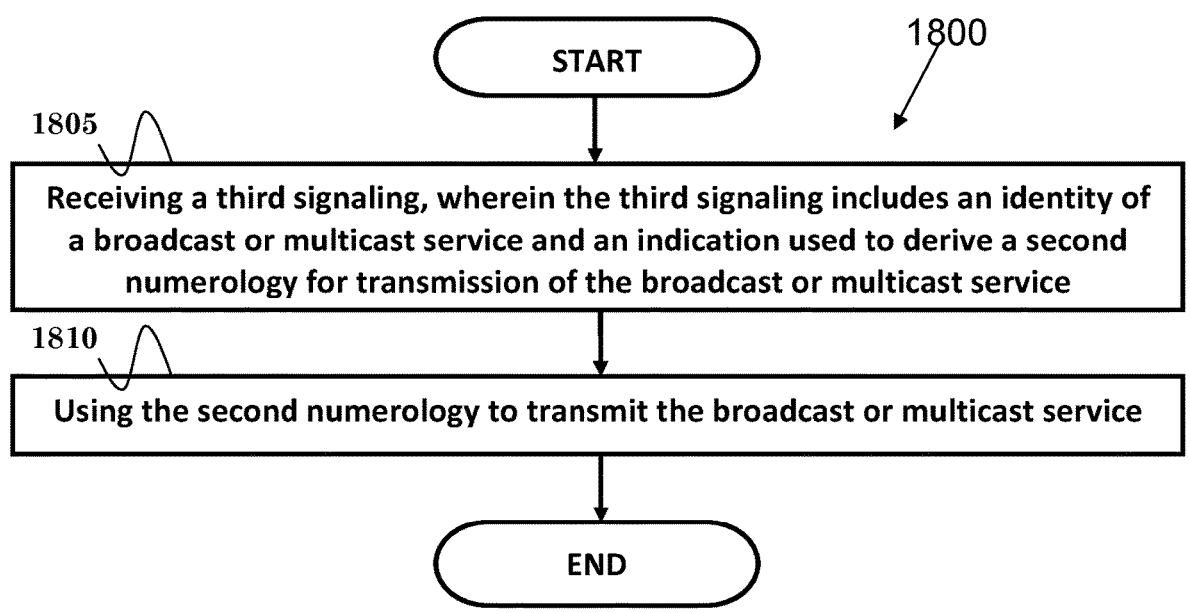
FIG. 18 is a flow chart according to one exemplary embodiment.

FIG. 18 is a flow chart 1800 according to one exemplary embodiment from the perspective of a base station. In step 1805, the base station receives a third signaling, wherein the third signaling includes an identity of a broadcast or multicast service and an indication used to derive a second numerology for transmission of the broadcast or multicast service. In step 1810, the base station uses the second numerology to transmit the broadcast or multicast service.

Referring back to FIGS. 3 and 4, in one exemplary embodiment of a base station, the device 300 includes a program code 312 stored in the memory 310. The CPU 308 could execute program code 312 (*i*) to receive a third signaling, wherein the third signaling includes an identity of a broadcast or multicast service and an indication used to derive a second numerology for transmission of the broadcast or multicast service, and (ii) to use the second numerology to transmit the broadcast or multicast service. Furthermore, the CPU 308 can execute the program code 312 to perform all of the above-described actions and steps or others described herein.

Figure 19:
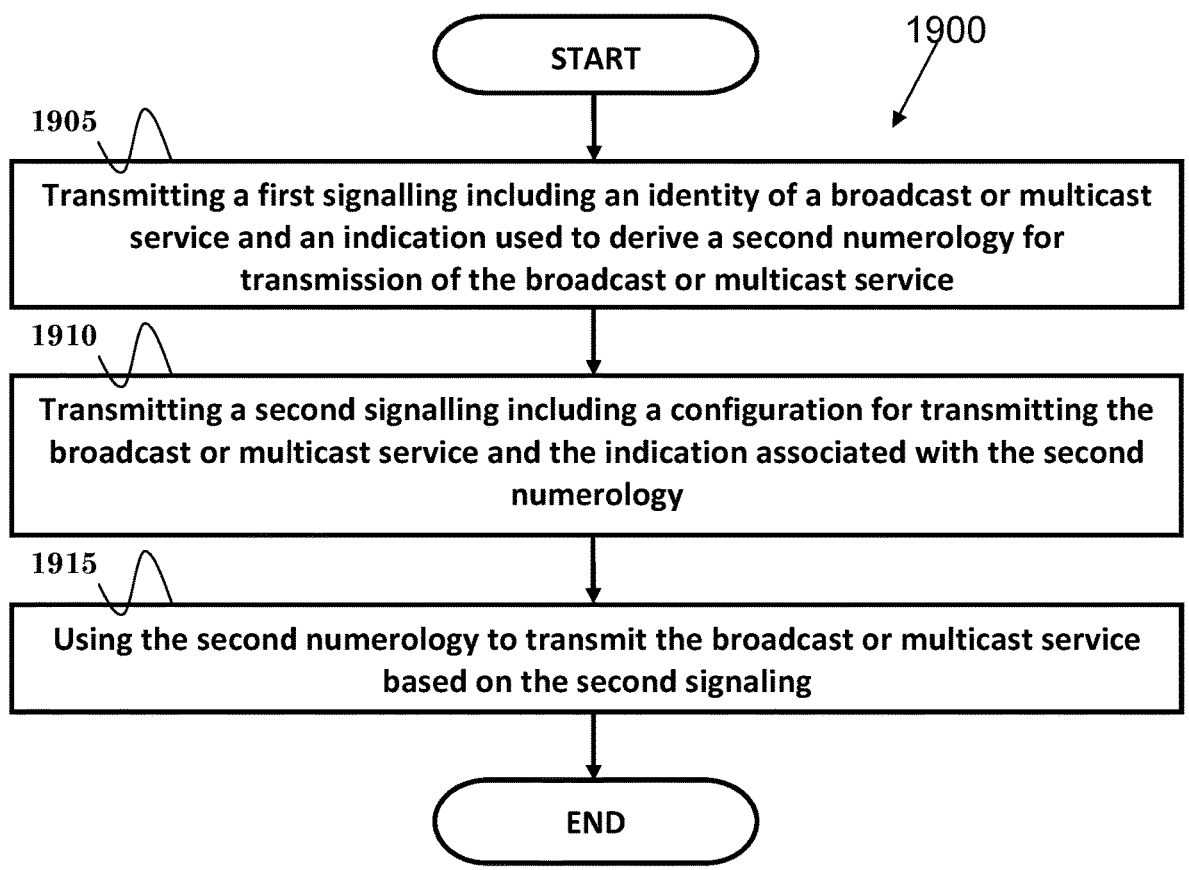
FIG. 19 is a flow chart according to one exemplary embodiment.

FIG. 19 is a flow chart 1900 according to one exemplary embodiment from the perspective of a base station. In step 1905, the base station transmits a first signalling including an identity of a broadcast or multicast service and an indication used to derive a second numerology for transmission of the broadcast or multicast service. In step 1910, the base station transmits a second signalling including a configuration for transmitting the broadcast or multicast service and the indication associated with the second numerology. The configuration for transmitting the broadcast or multicast service could include resource allocation (e.g., a set of frame(s), symbol(s), slot(s), and/or subframe(s)) on which the base station transmits the broadcast or multicast service. In step 1915, the base station uses the second numerology to transmit the broadcast or multicast service based on the second signaling.

In one embodiment, the base station could transmit a system information for broadcast or multicast including a configuration for transmitting the second signalling. The configuration for transmitting the second signalling could include resource allocation (e.g., a set of frames, subframes, symbols, and/or slots) on which the base station transmits the second signalling. The system information for broadcast or multicast could include an identity or index of a first numerology for transmission of the second signaling.

Referring back to FIGS. 3 and 4, in one exemplary embodiment of a base station, the device 300 includes a program code 312 stored in the memory 310. The CPU 308 could execute program code 312 (i) to transmit a first signalling including an identity of a broadcast or multicast service and an indication used to derive a second numerology for transmission of the broadcast or multicast service, (ii) to transmit a second signalling including a configuration for transmitting the broadcast or multicast service and the indication associated with the second numerology, and (iii) to use the second numerology to transmit the broadcast or multicast service based on the second signaling. Furthermore, the CPU 308 can execute the program code 312 to perform all of the above-described actions and steps or others described herein.

Figure 20:
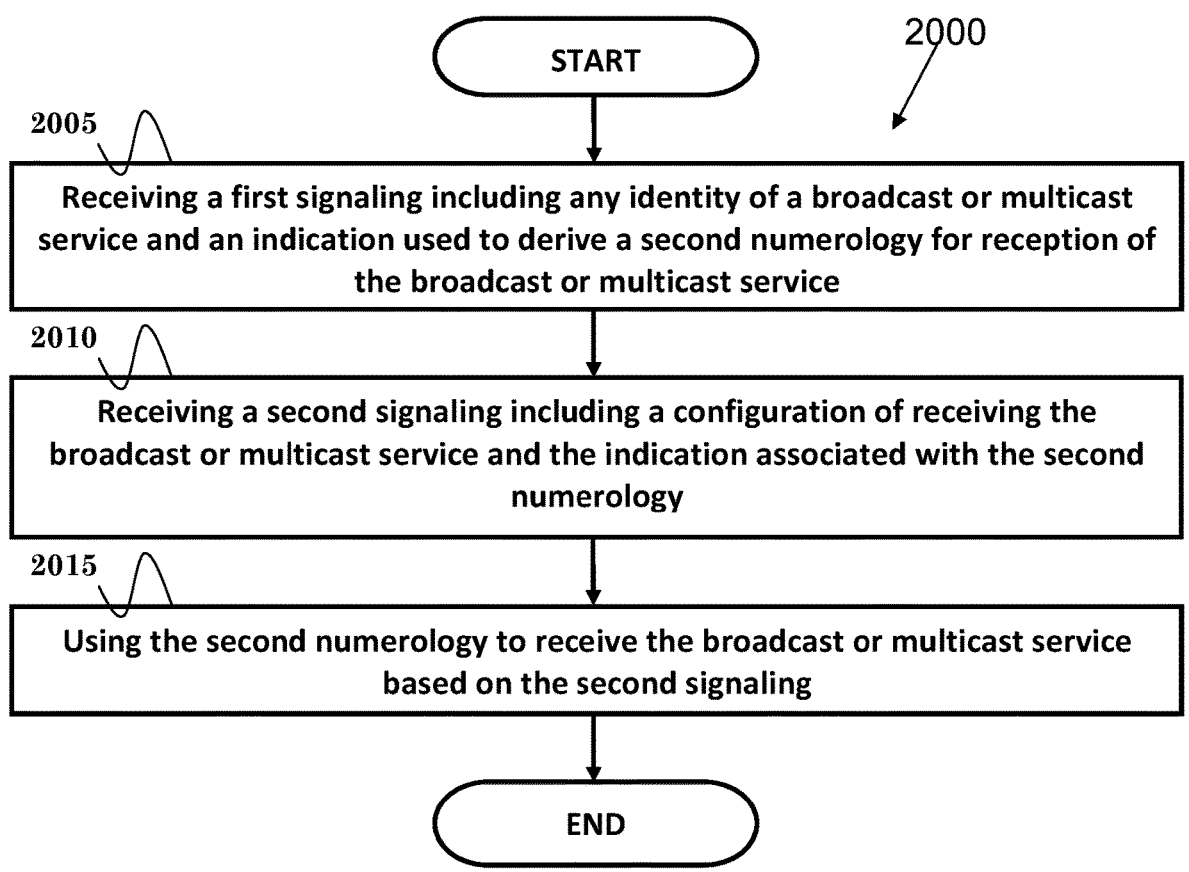
FIG. 20 is a flow chart according to one exemplary embodiment.

FIG. 20 is a flow chart 2000 according to one exemplary embodiment from the perspective of a UE. In step 2005, the UE receives a first signaling including any identity of a broadcast or multicast service and an indication used to derive a second numerology for reception of the broadcast or multicast service. In step 2010, the UE receives a second signaling including a configuration for receiving the broadcast or multicast service and the indication associated with the second numerology. The configuration for receiving the broadcast or multicast service could include resource allocation (e.g., a set of frame(s), subframe(s), symbol(s), and/or slot(s)) on which the UE receives the broadcast or multicast service. In step 2015, the UE uses the second numerology to receive the broadcast or multicast service based on the second signaling.

In one embodiment, the UE could receive a system information for broadcast or multicast including a configuration for receiving the second signaling. The system information for broadcast or multicast could include an identity or index of a first numerology for reception of the second signaling. The configuration of receiving the second signaling could include resource allocation (e.g., a set of frame(s), subframe(s), symbol(s), and/or slot(s)) on which the UE receives the second signaling.

Referring back to FIGS. 3 and 4, in one exemplary embodiment of a UE, the device 300 includes a program code 312 stored in the memory 310. The CPU 308 could execute program code 312 (i) to receive a first signaling including any identity of a broadcast or multicast service and an indication used to derive a second numerology for reception of the broadcast or multicast service, (ii) to receive a second signaling including a configuration of receiving the broadcast or multicast service and the indication associated with the second numerology, and (iii) to use the second numerology to receive the broadcast or multicast service based on the second signaling. Furthermore, the CPU 308 can execute the program code 312 to perform all of the above-described actions and steps or others described herein.

Figure 21:
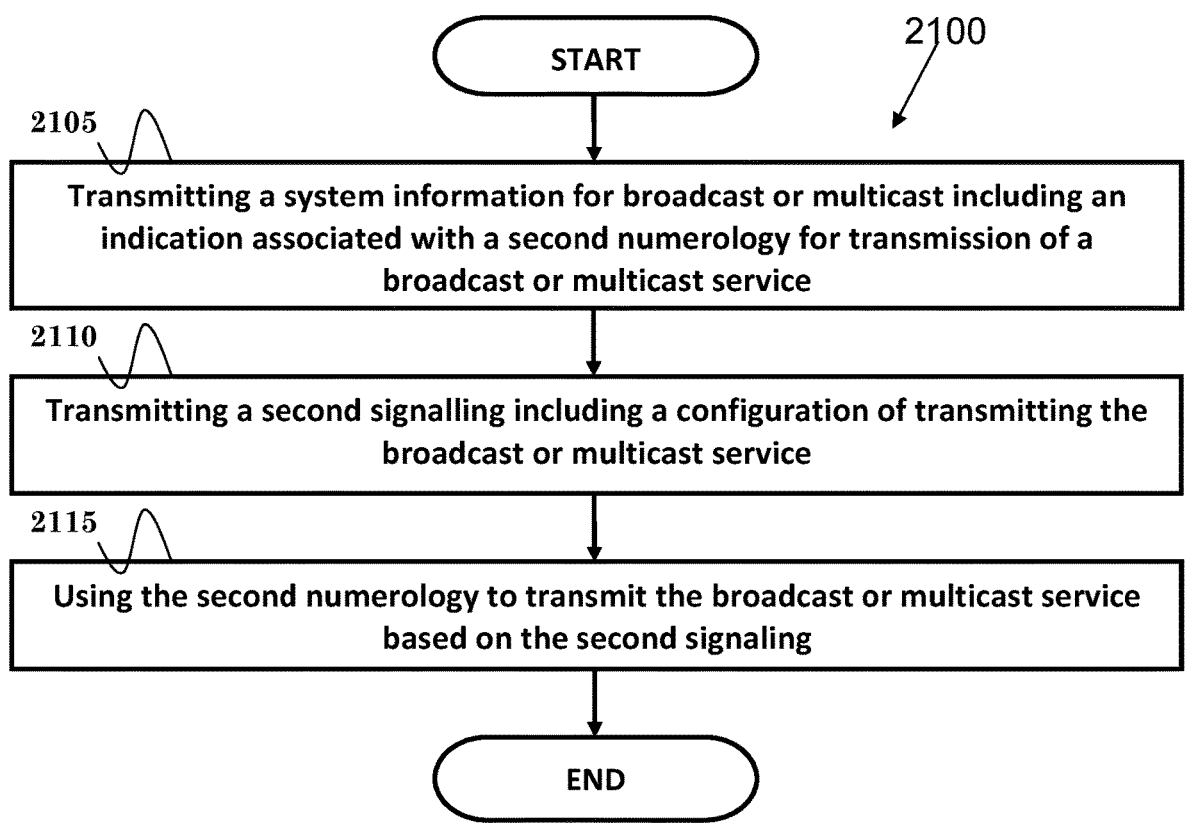
FIG. 21 is a flow chart according to one exemplary embodiment.

FIG. 21 is a flow chart 2100 according to one exemplary embodiment from the perspective of a base station. In step 2105, the base station transmits a system information for broadcast or multicast including an indication associated with a second numerology for transmission of a broadcast or multicast service. In step 2110, the base station transmits a second signalling including a configuration of transmitting the broadcast or multicast service. In step 2115, the base station uses the second numerology to transmit the broadcast or multicast service based on the second signaling.

In one embodiment, the base station could transmit a first signalling, wherein the first signalling could include an identity of the broadcast or multicast service. The first signalling could also include the indication used to derive the second numerology for transmission of the broadcast or multicast service. The configuration of transmitting the broadcast or multicast service could include resource allocation (e.g., a set of frame(s), subframe(s), symbol(s), and/or slot(s)) on which the base station transmits the broadcast or multicast service. The system information for broadcast or multicast could include a configuration for transmitting the second signaling.

The configuration for transmitting the second signaling could include resource allocation (e.g., a set of frame(s), subframe(s), symbol(s), and/or slot(s)) on which the base station transmits the second signaling. The system information for broadcast or multicast could include an identity or index of a first numerology for transmission of the second signaling.

Referring back to FIGS. 3 and 4, in one exemplary embodiment of a base station, the device 300 includes a program code 312 stored in the memory 310. The CPU 308 could execute program code 312 (i) to transmit a system information for broadcast or multicast including an indication associated with a second numerology for transmission of a broadcast or multicast service, (ii) to transmit a second signalling including a configuration of transmitting the broadcast or multicast service, and (iii) to use the second numerology to transmit the broadcast or multicast service based on the second signaling. Furthermore, the CPU 308 can execute the program code 312 to perform all of the above-described actions and steps or others described herein.

Figure 22:
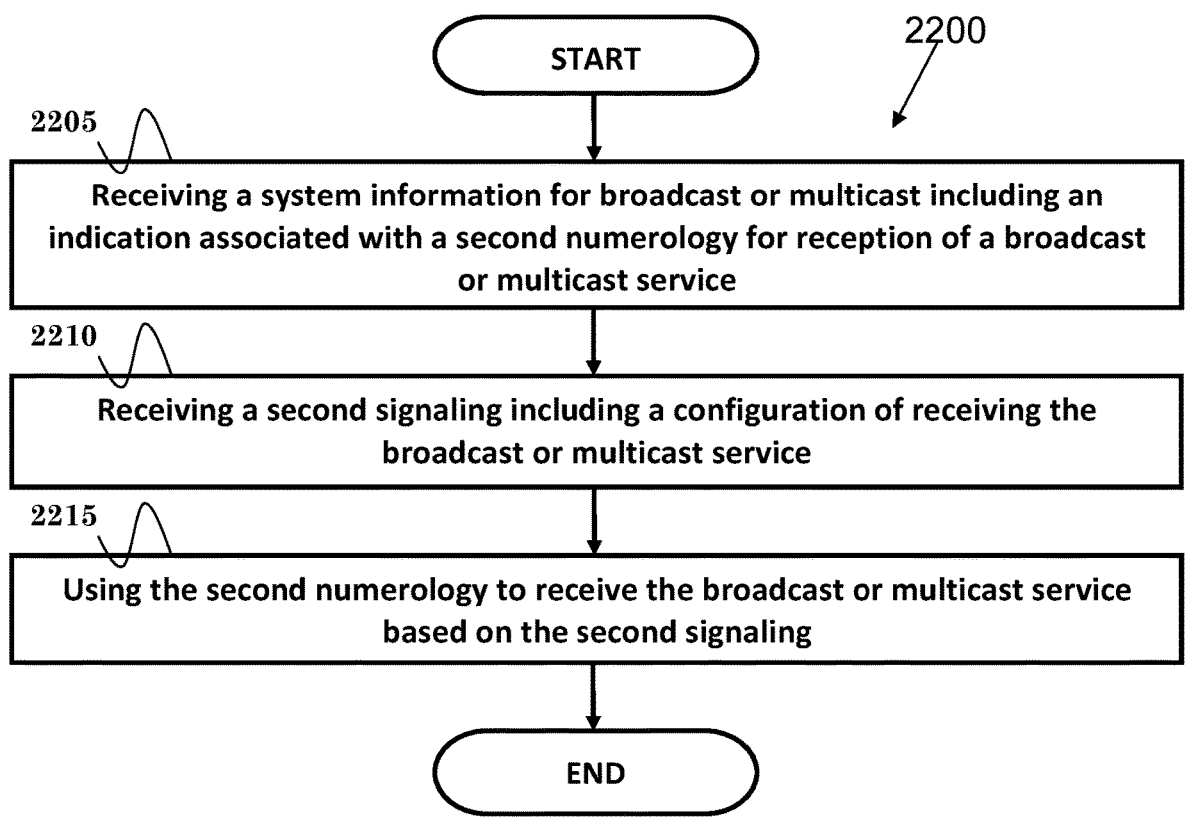
FIG. 22 is a flow chart according to one exemplary embodiment.

FIG. 22 is a flow chart 2200 according to one exemplary embodiment from the perspective of a UE. In step 2205, the UE receives a system information for broadcast or multicast including an indication associated with a second numerology for reception of a broadcast or multicast service. In step 2210, the UE receives a second signalling including a configuration of receiving the broadcast or multicast service. In step 2215, the UE uses the second numerology to receive the broadcast or multicast service based on the second signaling.

In one embodiment, the UE could receive a first signalling, wherein the first signalling includes an identity of the broadcast or multicast service. The first signalling could include the indication used to derive the second numerology for reception of the broadcast or multicast service. The configuration of receiving the broadcast or multicast service could include resource allocation (e.g., a set of frame(s), subframe(s), symbol(s), and/or slot(s)) on which the UE receives the broadcast or multicast service.

The system information for broadcast or multicast could include a configuration for receiving the second signaling. The configuration for receiving the second signaling could include resource allocation (e.g., a set of frame(s), subframe(s), symbol(s), and/or slot(s)) on which the UE receives the second signaling. The system information for broadcast or multicast could include an identity or index of a first numerology for reception of the second signaling.

Referring back to FIGS. 3 and 4, in one exemplary embodiment of a UE, the device 300 includes a program code 312 stored in the memory 310. The CPU 308 could execute program code 312 (i) to receive a system information for broadcast or multicast including an indication associated with a second numerology for reception of the broadcast or multicast service, (ii) to receive a second signaling including a configuration of receiving the broadcast or multicast service, and (iii) to use the second numerology to receive the broadcast or multicast service based on the second signaling. Furthermore, the CPU 308 can execute the program code 312 to perform all of the above-described actions and steps or others described herein.

Figure 23:
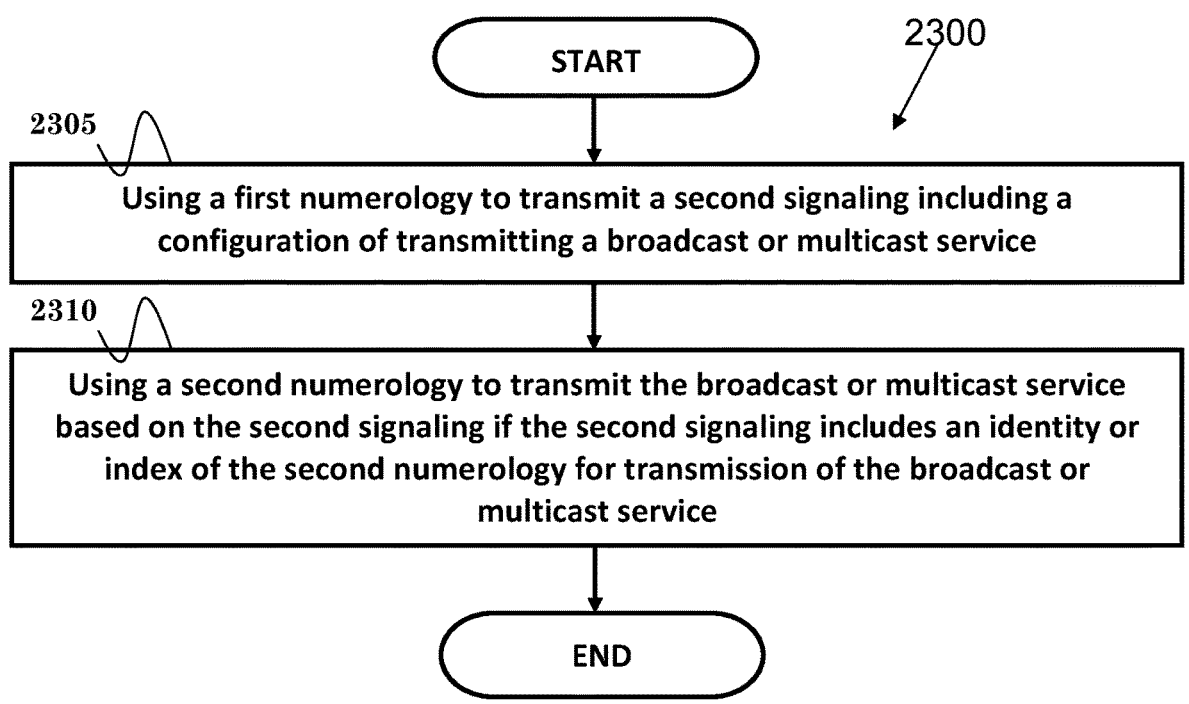
FIG. 23 is a flow chart according to one exemplary embodiment.

FIG. 23 is a flow chart 2300 according to one exemplary embodiment from the perspective of a base station. In step 2305, the base station uses a first numerology to transmit a second signaling including a configuration of transmitting a broadcast or multicast service. In step 2310, the base station uses a second numerology to transmit the broadcast or multicast service based on the second signaling if the second signaling includes an identity or index of the second numerology for transmission of the broadcast or multicast service.

In one embodiment, the base station could use the first numerology to transmit the broadcast or multicast service based on the second signaling if the second signalling does not indicate any numerology for transmission of the broadcast or multicast service. The configuration of transmitting the broadcast or multicast service could include resource allocation (e.g., a set of frame(s), subframe(s), symbol(s), and/or slot(s)) on which the base station transmits the broadcast or multicast service.

In one embodiment, the base station could transmit a system information for broadcast or multicast including a configuration of transmitting the second signaling. The system information for broadcast or multicast could include an identity or index of a first numerology for transmission of the second signaling. The configuration of transmitting the second signaling could include resource allocation (e.g., a set of frame(s), subframe(s), symbol(s), and/or slot(s)) on which the base station transmits the second signaling.

Referring back to FIGS. 3 and 4, in one exemplary embodiment of a base station, the device 300 includes a program code 312 stored in the memory 310. The CPU 308 could execute program code 312 (i) to use a first numerology to transmit a second signaling including a configuration of transmitting a broadcast or multicast service, and (ii) to use a second numerology to transmit the broadcast or multicast service based on the second signaling if the second signaling includes an identity or index of the second numerology for transmission of the broadcast or multicast service. Furthermore, the CPU 308 can execute the program code 312 to perform all of the above-described actions and steps or others described herein.

Figure 24:
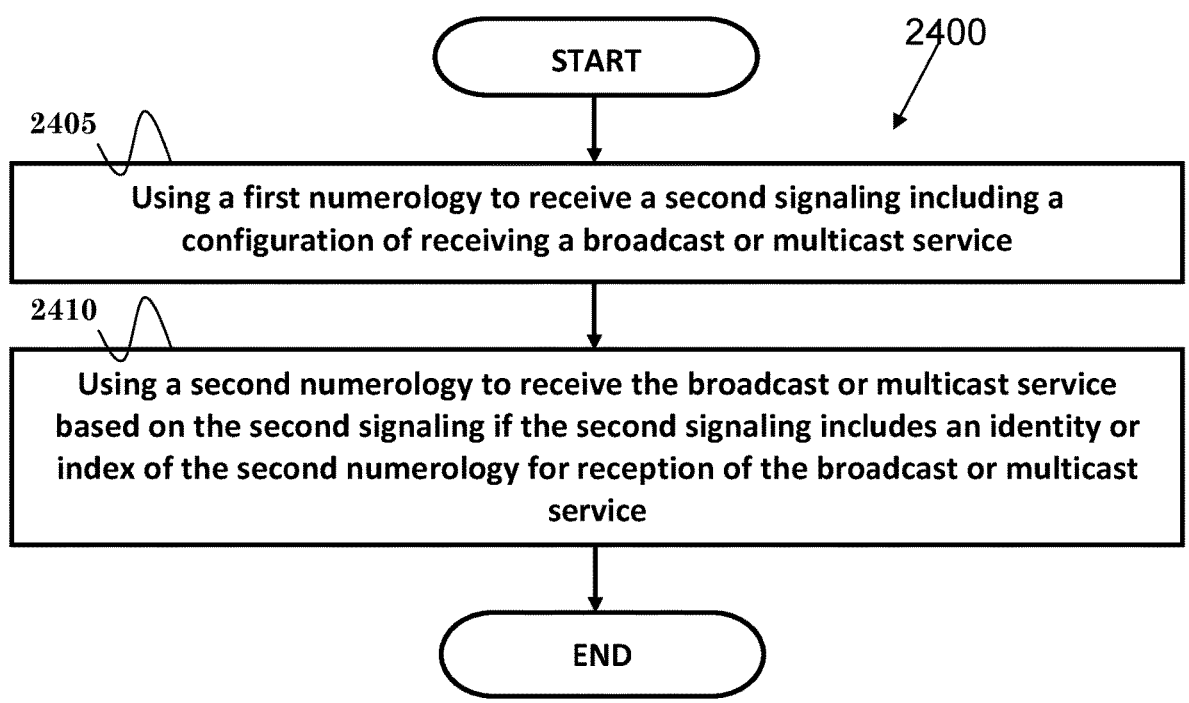
FIG. 24 is a flow chart according to one exemplary embodiment.

FIG. 24 is a flow chart 2400 according to one exemplary embodiment from the perspective of a UE. In step 2405, the UE uses a first numerology to receive a second signaling including a configuration of receiving a broadcast or multicast service. In step 2410, the UE uses a second numerology to receive the broadcast or multicast service based on the second signaling if the second signaling includes an identity or index of the second numerology for reception of the broadcast or multicast service.

In one embodiment, the UE could use the first numerology to receive the broadcast or multicast service based on the second signaling if the second signalling does not indicate any numerology for reception of the broadcast or multicast service. The configuration for receiving the broadcast or multicast service could include resource allocation (e.g., a set of frames, subframes, symbols, and/or slots) on which the UE receives the broadcast or multicast service.

In one embodiment, the UE could receive a system information for broadcast or multicast including a configuration for receiving the second signaling. The system information for broadcast or multicast could include an identity/index of a first numerology for reception of the second signaling. The configuration of receiving the second signaling could include resource allocation (e.g., a set of frames, subframes, symbols, and/or slots) on which the UE receives the second signaling.

Referring back to FIGS. 3 and 4, in one exemplary embodiment of a UE, the device 300 includes a program code 312 stored in the memory 310. The CPU 308 could execute program code 312 (i) to use a first numerology to receive a second signaling including a configuration of receiving a broadcast or multicast service, and (ii) to use a second numerology to receive the broadcast or multicast service based on the second signaling if the second signaling includes an identity or index of the second numerology for reception of the broadcast or multicast service. Furthermore, the CPU 308 can execute the program code 312 to perform all of the above-described actions and steps or others described herein.

Figure 25:
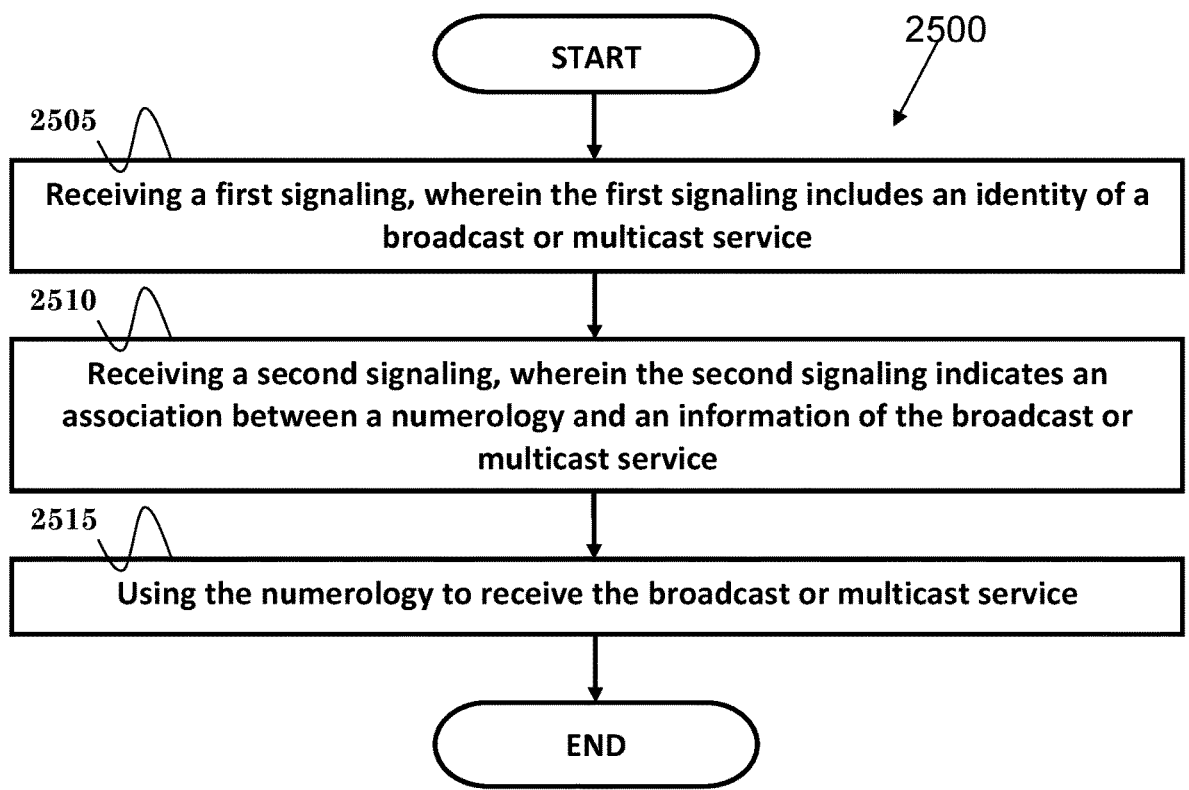
FIG. 25 is a flow chart according to one exemplary embodiment.

FIG. 25 is a flow chart 2500 according to one exemplary embodiment from the perspective of a UE. In step 2505, the UE receives a first signaling, wherein the first signaling includes an identity of a broadcast or multicast service. The first signaling could be a user service description.

In step 2510, the UE receives a second signaling, wherein the second signaling indicates an association between a numerology and an information of the broadcast or multicast service. The first signaling could include the information. The information could be an identity of QoS associated with the broadcast or multicast service, a group identity associated with the broadcast or multicast service, a MBMS service area associated with the broadcast or multicast service, a bandwidth part associated with the broadcast or multicast service, the identity of the broadcast or multicast service, a MCH associated with the broadcast or multicast service, or a MBSFN area associated with the broadcast or multicast service.

In one embodiment, the second signaling could be system information for broadcast or multicast. The second signaling could be received via Multicast Control Channel.

In step 2515, the UE uses the numerology to receive the broadcast or multicast service.

Referring back to FIGS. 3 and 4, in one exemplary embodiment of a UE, the device 300 includes a program code 312 stored in the memory 310. The CPU 308 could execute program code 312 (i) to receive a first signaling, wherein the first signaling includes an identity of a broadcast or multicast service, (ii) to receive a second signaling, wherein the second signaling indicates an association between a numerology and an information of the broadcast or multicast service, and (iii) to use the numerology to receive the broadcast or multicast service. Furthermore, the CPU 308 can execute the program code 312 to perform all of the above-described actions and steps or others described herein.

Figure 26:
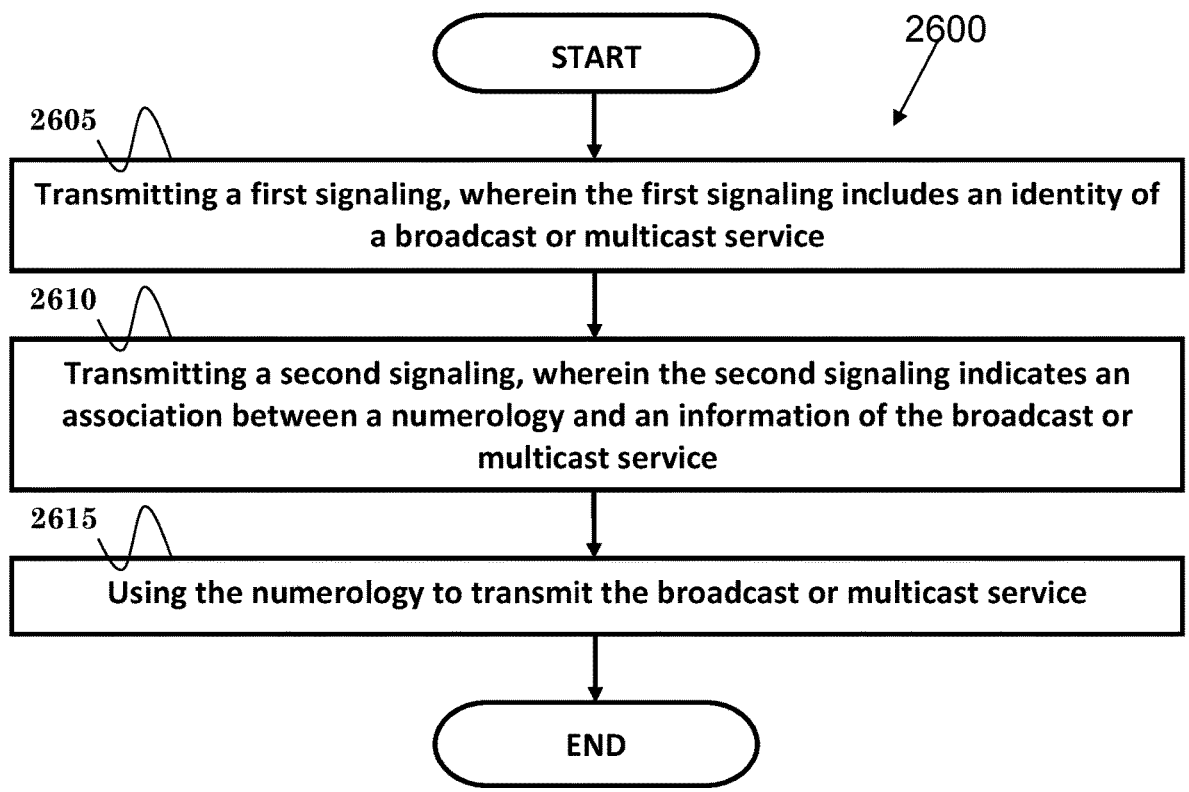
FIG. 26 is a flow chart according to one exemplary embodiment.

FIG. 26 is a flow chart 2600 according to one exemplary embodiment from the perspective of a base station. In step 2605, the base station transmits a first signaling, wherein the first signaling includes an identity of a broadcast or multicast service. The first signaling could be a user service description.

In step 2610, the base station transmits a second signaling, wherein the second signaling indicates an association between a numerology and an information of the broadcast or multicast service. The first signaling could include the information. The information could be an identity of QoS associated with the broadcast or multicast service, a group identity associated with the broadcast or multicast service, a MBMS service area associated with the broadcast or multicast service, a bandwidth part associated with the broadcast or multicast service, the identity of the broadcast or multicast service, a MCH associated with the broadcast or multicast service, or a MBSFN area associated with the broadcast or multicast service.

In one embodiment, the second signaling could be system information for broadcast or multicast. The second signaling could be received via Multicast Control Channel.

In step 2615, the base station uses the numerology to transmit the broadcast or multicast service.

Referring back to FIGS. 3 and 4, in one exemplary embodiment of a base station, the device 300 includes a program code 312 stored in the memory 310. The CPU 308 could execute program code 312 (*i*) to transmit a first signaling, wherein the first signaling includes an identity of a broadcast or multicast service, (ii) to transmit a second signaling, wherein the second signaling indicates an association between a numerology and an information of the broadcast or multicast service, and (iii) to use the numerology to transmit the broadcast or multicast service. Furthermore, the CPU 308 can execute the program code 312 to perform all of the above-described actions and steps or others described herein.

In the context of the embodiments illustrated in FIGS. 13-26 and discussed above, in one embodiment, the system information for broadcast or multicast could be received on a broadcast channel or a dedicated channel. The first signaling could be user service description. The second signaling could be received on a NR-MCCH. The third signaling could be received from a network node (e.g., MCE in LTE) in core network.

In one embodiment, the broadcast or multicast service could be received on a NR-MTCH. The indication could be associated with an identity of the broadcast or multicast service (e.g., TMGI), or with an identity of a channel used to receive the broadcast or multicast service (e.g., LCID). The channel could be a NR-MTCH.

The indication could be associated with a NR-MCH configuration of receiving the broadcast or multicast service. The NR-MCH configuration could include an identity of the broadcast or multicast service (e.g., TMGI) and/or an identity of a channel used to receive the broadcast or multicast service (e.g., LCID). Furthermore, the indication could be associated with resource allocation (e.g., a set of specific frames, subframes, symbols, and/or slots) used to receive the broadcast or multicast service.

The indication could be an index or identity of the associated numerology, an index or identity of QoS associated with the broadcast or multicast service, or an index or identity of a QoS group or a QoS class associated with the broadcast or multicast service.

The indication could also be an identity of broadcast or multicast area (e.g., MBSFN area ID), an identity of broadcast or multicast service area (e.g., MBSFN service area ID), or an identity of a group associated with the broadcast or multicast service.

Based on the invention, gNB and UEs can use the same numerology to transmit or receive a broadcast or multicast service.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment) in a wireless communication system, comprising:
receiving by the UE a first of multiple signalings from a network, including an identification of a vehicle-to-everything (V2X) service of multiple broadcast or multicast services provided by the network, wherein at least two of the multiple broadcast or multicast services are each associated with different sub-carrier spacing and the V2X service is associated with one of the different sub-carrier spacing, wherein the multiple broadcast or multicast services provided by the network include at least the V2X service and a second service that is not V2X;
receiving by the UE a second of the multiple signalings from the network that indicates the one of the different sub-carrier spacing that is associated with the V2X service; and
acquiring by the UE the V2X service from the network utilizing the sub-carrier spacing associated with the V2X service based on the second of the multiple signalings.

2. The method of claim 1, wherein the first of the multiple signalings is a user service description.

3. The method of claim 1, wherein the identification is a Temporary Mobile Group Identity (TMGI).

4. The method of claim 1, wherein the second of the multiple signals, signalings indicates an association between the sub-carrier spacing associated with the V2X service and at least one of an identity of QoS (Quality of Service) associated with the V2X service or a group identity associated with the V2X service.

5. The method of claim 1, wherein the second of the multiple signalings indicates an association between the sub-carrier spacing associated with the V2X service and at least one of a bandwidth part associated with the V2X service or the identification of the V2X service.

6. The method of claim 1, wherein the second of the multiple signalings indicates an association between the sub-carrier spacing associated with the V2X service and at least one of a MCH (Multicast Channel) associated with the V2X service, a MBSFN (Multicast Broadcast Single Frequency Network) area associated with the V2X service, or a MBMS (Multimedia Broadcast Multicast Service) service area associated with the V2X service.

7. The method of claim 1, wherein the second of the multiple signalings is a system information for broadcast or multicast or is received via Multicast Control Channel.

8. A User Equipment (UE) in a wireless communication system, comprising:
a control circuit;
a processor installed in the control circuit; and
a memory installed in the control circuit and operatively coupled to the processor;
wherein the processor is configured to execute a program code stored in the memory to:
receive a first of multiple signalings from a network, including an identification of a vehicle-to-everything (V2X) service of multiple broadcast or multicast services provided by the network, wherein at least two of the multiple broadcast or multicast services are each associated with different sub-carrier spacing and the V2X service is associated with one of the different sub-carrier spacing, wherein the multiple broadcast or multicast services provided by the network include at least the V2X service and a second service that is not V2X;
receive a second of the multiple signalings from the network that indicates the one of the different sub-carrier spacing, that is associated with the V2X service; and
acquire the V2X service from the network utilizing the sub-carrier spacing associated with the V2X service based on the second of the multiple signalings.

9. The UE of claim 8, wherein the first of the multiple signalings is a user service description.

10. The UE of claim 8, wherein the identification is a Temporary Mobile Group Identity (TMGI).

11. The UE of claim 8, wherein the second of the multiple signalings indicates an association between the sub-carrier spacing associated with the V2X service and at least one of an identity of QoS (Quality of Service) associated with the V2X service or a group identity associated with the V2X service.

12. The UE of claim 8, wherein the second of the multiple signalings indicates an association between the sub-carrier spacing associated with the V2X service and at least one of a bandwidth part associated with the particular V2X service or the identification of the V2X service.

13. The UE of claim 8, wherein the second of the multiple signalings indicates an association between the sub-carrier spacing associated with the V2X service and at least one of a MCH (Multicast Channel) associated with the V2X service, a MBSFN (Multicast Broadcast Single Frequency Network) area associated with the V2X service, or a MBMS (Multimedia Broadcast Multicast Service) service area associated with the V2X service.

14. The UE of claim 8, wherein the second of the multiple signalings is a system information for broadcast or multicast or is received via Multicast Control Channel.

15. A method of a network in a wireless communication system, comprising:
- transmitting a first of multiple signalings, including an identification of a vehicle-to-everything (V2X) service of multiple broadcast or multicast services provided by the network, wherein at least two of the multiple broadcast or multicast services are each associated with different sub-carrier spacing and the V2X service is associated with one of the different sub-carrier spacing, wherein the multiple broadcast or multicast services provided by the network include at least the V2X service and a second service that is not V2X;
- transmitting a second of the multiple signalings that indicates the one of the different sub-carrier spacing that is associated with the V2X service; and
- transmitting the V2X service utilizing the sub-carrier spacing associated with the V2X service based on the second of the multiple signalings.

16. The method of claim 15, wherein the first of the multiple signalings is a user service description.

17. The method of claim 15, wherein the identification is a Temporary Mobile Group Identity (TMGI).

18. The method of claim 15, wherein the second of the multiple signalings indicates an association between the sub-carrier spacing associated with the V2X service and at least one of an identity of QoS (Quality of Service) associated with the V2X service, a group identity associated with the V2X service, a bandwidth part associated with the V2X service, or the identification of the V2X service.

19. The method of claim 15, wherein the second of the multiple signalings indicates an association between the sub-carrier spacing associated with the V2X service and at least one of a MCH (Multicast Channel) associated with the V2X service, a MBSFN (Multicast Broadcast Single Frequency Network) area associated with the V2X service, or a MBMS (Multimedia Broadcast Multicast Service) service area associated with the V2X service.

20. The method of claim 15, wherein the second of the multiple signalings is a system information for broadcast or multicast or is transmitted via Multicast Control Channel.

* * * * *